United States Patent
Yamada

(10) Patent No.: US 8,224,043 B2
(45) Date of Patent: Jul. 17, 2012

(54) FINGERPRINT IMAGE ACQUIRING DEVICE, FINGERPRINT AUTHENTICATING APPARATUS, FINGERPRINT IMAGE ACQUIRING METHOD, AND FINGERPRINT AUTHENTICATING METHOD

(75) Inventor: Shigefumi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 417 days.

(21) Appl. No.: 12/494,953

(22) Filed: Jun. 30, 2009

(65) Prior Publication Data
US 2010/0046810 A1 Feb. 25, 2010

(30) Foreign Application Priority Data
Aug. 20, 2008 (JP) ................................. 2008-211407

(51) Int. Cl.
G06K 9/36 (2006.01)
(52) U.S. Cl. ....................................................... 382/124
(58) Field of Classification Search .......................... None
See application file for complete search history.

(56) References Cited

U.S. PATENT DOCUMENTS

| | | | |
|---|---|---|---|
| 6,289,114 B1 | 9/2001 | Mainguet | |
| 6,898,301 B2 | 5/2005 | Iwanaga | |
| 7,194,115 B2 * | 3/2007 | Uchida | 382/124 |
| 2002/0003892 A1 | 1/2002 | Iwanaga | |
| 2004/0136612 A1 * | 7/2004 | Meister et al. | 382/299 |
| 2006/0067565 A1 * | 3/2006 | Ikeda | 382/124 |
| 2007/0154073 A1 * | 7/2007 | Hamid et al. | 382/124 |
| 2007/0206842 A1 * | 9/2007 | Hamid | 382/125 |
| 2007/0274575 A1 * | 11/2007 | Russo | 382/124 |
| 2008/0211915 A1 * | 9/2008 | McCubbrey | 348/159 |
| 2009/0060286 A1 * | 3/2009 | Wheeler et al. | 382/117 |
| 2009/0226052 A1 | 9/2009 | Fedele et al. | |

FOREIGN PATENT DOCUMENTS

| | | |
|---|---|---|
| JP | 10-091769 | 4/1998 |
| JP | 11-134494 | 5/1999 |
| JP | 2001-344605 | 12/2001 |
| JP | 2002-024831 | 1/2002 |
| JP | 2003-208620 | 7/2003 |
| JP | 2004-005619 | 1/2004 |

(Continued)

OTHER PUBLICATIONS

A. Jain and A. Ross, "Fingerprint Mosaicking", in Proceedings of IEEE International Conference on Acoustic, Speech, and Signal Processing (ICASSP), 4, pp. 4064-4067, (Orlando, FL), May 2002.

(Continued)

*Primary Examiner* — Brian P Werner
(74) *Attorney, Agent, or Firm* — Fujitsu Patent Center

(57) ABSTRACT

A fingerprint image acquiring device includes: a fingerprint image input unit to which fingerprint images are input consecutively; an image correlating unit to correlate a plurality of fingerprint images input from the fingerprint image input unit, the image correlating unit matching the input fingerprint images in position; a resolution enhancing determining unit to determine whether an area making resolution enhancing possible is present by detecting an area overlapping between fingerprint images as a result of image correlating and estimating similarity between the fingerprint images; an image synthesizing unit to synthesize the fingerprint images based on a result of the position matching by the image correlating unit; and a resolution enhancing unit to enhance a resolution of the area making resolution enhancing possible in the fingerprint image, wherein a fingerprint image is generated by partially enhancing the fingerprint image input to the fingerprint image input unit in resolution.

20 Claims, 35 Drawing Sheets

FOREIGN PATENT DOCUMENTS

| | | |
|---|---|---|
| JP | 2006-012080 | 1/2006 |
| JP | 2007-524906 | 8/2007 |
| JP | 2007-271690 | 10/2007 |
| JP | 2007-323616 | 12/2007 |

OTHER PUBLICATIONS

Anil Jain, Yi Chen and Meltem Demirkus, "Pores and Ridges: High-Resolution Fingerprint Matching Using Level 3 Features", IEEE Transactions on Pattern Analysis and Machine Intelligence, vol. 29, No. 1, pp. 15-27, Jan. 2007.

Japanese Office Action mailed May 29, 2012 for corresponding Japanese Application No. 2008-211407, with English-language translation.

\* cited by examiner

[IMAGE 1]

[IMAGE 2]

[RESULT OF POSITION MATCHING]

[IMAGE AFTER SUPER-RESOLUTION]

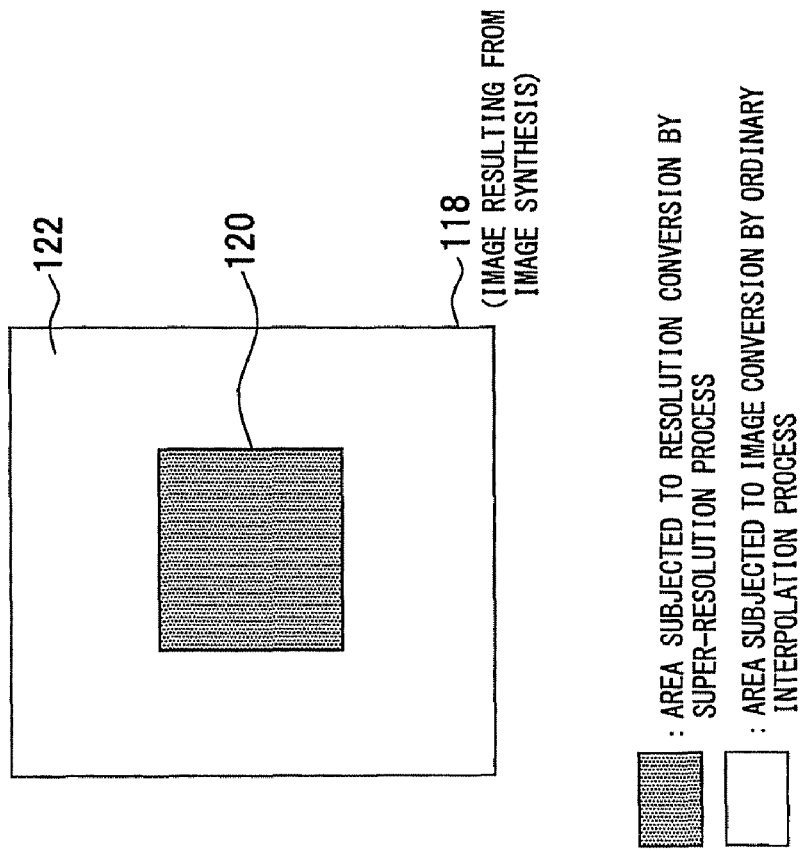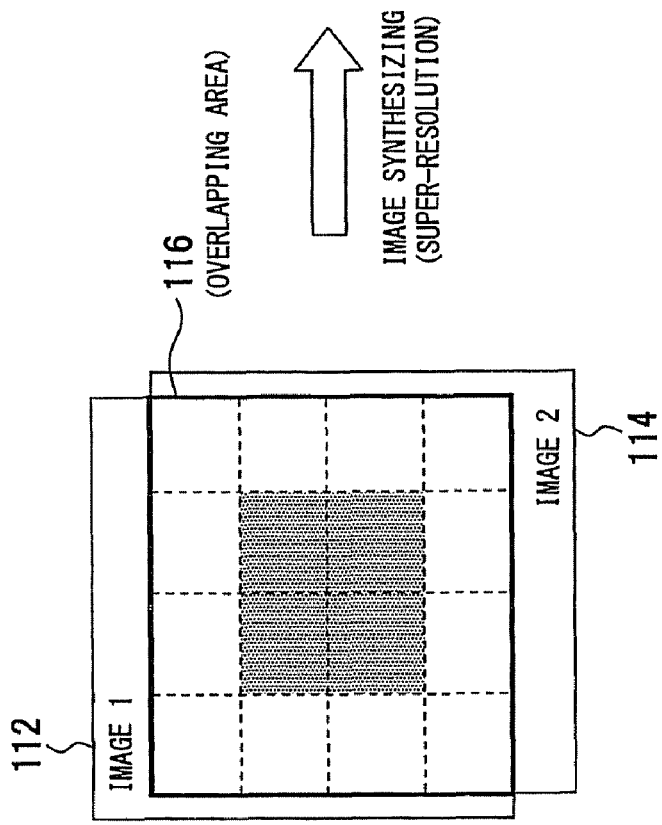

x : AMOUNT OF SHIFT
y : AMOUNT OF SHIFT
θ : ROTATION ANGLE
P1 : CORRESPONDING POINT BETWEEN IMAGES
P2 : CORRESPONDING POINT BETWEEN IMAGES ly to the fingerprinting surface or the fingerprinting surface (fingerprint sensor) is moved relative to the finger, and that the whole of a fingerprint image is restructured out of the plurality of partial images. Information of a feature point (a branch point and an end point of a ridgeline) is extracted and generated from such a restructured fingerprint image, and personal authentication is carried out based on the information. Moving the finger relative to the fingerprinting surface is referred to as "sweep or slide". The same method of synthesizing a plurality of partial images to acquire an image of the whole fingerprint is also applied to a small-sized flat fingerprint sensor (see Nonpatent Literature 1: A. Jain and A. Ross, "Fingerprint Mosaicking", in Proceeding of IEEE International Conference on Acoustics, Speech, and Signal Processing (ICASSP), 4, pp. 4064-4067, (Orland, Fla.), May 2002).

FINGERPRINT IMAGE ACQUIRING DEVICE, FINGERPRINT AUTHENTICATING APPARATUS, FINGERPRINT IMAGE ACQUIRING METHOD, AND FINGERPRINT AUTHENTICATING METHOD

CROSS-REFERENCE TO RELATED APPLICATION

This application is based upon and claims the benefit of priority of the prior Japanese Patent Application No. 2008-211407, filed on Aug. 20, 2008, the entire contents of which are incorporated herein by reference.

FIELD

The embodiments discussed herein are related to a device used for acquirement of a fingerprint image for carrying out personal authentication, etc., based on fingerprint information, an apparatus used for fingerprint authentication by the fingerprint image and methods therefor.

BACKGROUND

In recent years, it is the latest trend that personal authentication with higher reliability (authenticating an equipment user to be the pre-registered authentic user) is required for use of an information system, information terminal equipment, such as a personal computer (PC) serving as part of an information system, and small-sized information equipment, such as a cellular phone and a PDA (Personal Digital Assistant). Meanwhile, personal authentication based on biometric information is highly reliable, and using a fingerprint as biometric information in particular offers high convenience.

In personal authentication using a fingerprint, the fingerprint (a pattern composed of a ridgeline that can be in contact with a fingerprinting surface of a fingerprint sensor and a valley line not in contact with a fingerprinting surface thereof) of a finger of an authenticated person is taken as image information (a fingerprint image), using a capacitive sensing fingerprint sensor or an optical fingerprint sensor. Feature information (e.g., a ridgeline shape and position information on a branch point and an end point) is extracted from this fingerprint image, and the extracted feature information is verified with pre-registered registered information (registered feature information) of the authenticated person. Based on a result of the verification, a determination on whether the authenticated person is the authentic person, i.e., personal authentication is carried out. A ridgeline pattern formed of the shape of a ridgeline and a feature point given by position information on an end point and a branch point of a ridgeline are mainly used as feature information. The ridgeline pattern is referred to as "feature quantity of level 1" and the feature point is referred to as "feature quantity of level 2".

A fingerprint sensor incorporated in information terminal equipment, such as a PC, or in small-sized information equipment, such as a cellular phone and PDA, has recently been reduced in size. Such a small-sized fingerprint sensor has a sensor area smaller than a finger, thus is incapable of acquiring an image of the whole fingerprint simply through one time image-taking.

For this reason, a fingerprint sensor having a small area acquires an image of the whole fingerprint by synthesizing a plurality of partial images that are taken consecutively through the sensor surface of the fingerprint sensor. A sweep fingerprint sensor is a fingerprint sensor that is equivalent to such a fingerprint sensor (e.g., see Patent Document 1: Japanese Laid-Open Patent Publication No. 10-91769 and Patent Document 2: Japanese Laid-Open Patent Publication No. 2003-208620). This sweep fingerprint sensor is sufficiently shorter than a finger and has a square fingerprinting surface of a small area (sensor surface/image-taking surface). The sweep fingerprint sensor is thus used in such a way that a plurality of partial images of a fingerprint are taken as the finger is moved relative to the fingerprinting surface or the fingerprinting surface (fingerprint sensor) is moved relative to the finger, and that the whole of a fingerprint image is restructured out of the plurality of partial images. Information of a feature point (a branch point and an end point of a ridgeline) is extracted and generated from such a restructured fingerprint image, and personal authentication is carried out based on the information. Moving the finger relative to the fingerprinting surface is referred to as "sweep or slide". The same method of synthesizing a plurality of partial images to acquire an image of the whole fingerprint is also applied to a small-sized flat fingerprint sensor (see Nonpatent Literature 1: A. Jain and A. Ross, "Fingerprint Mosaicking", in Proceeding of IEEE International Conference on Acoustics, Speech, and Signal Processing (ICASSP), 4, pp. 4064-4067, (Orland, Fla.), May 2002).

With respect to the above fingerprint authentication, Patent Document 3 (Japanese Laid-Open Patent Publication No. 2002-024831) discloses an invention that enables verifying a fingerprint image read by a cellular phone with a registered fingerprint image at sufficiently high authentication precision. Patent Document 4 (Japanese Laid-Open Patent Publication No. 2004-005619) discloses an invention that enables verifying with a registered fingerprint image at sufficiently high authentication precision even in a case where only the partial fingerprint image is acquirable. Patent Document 5 (Japanese Laid-Open Patent Publication No. 2001-344605) discloses an invention that the reproducibility of feature points extracted from each of a plurality of fingerprint images is estimated to sort out a feature point to be used.

For an improvement in capability of distinguishing a person from another person, a method using the outline of a fingerprint ridgeline and position information on a sweat gland pore has been studied. A feature quantity representing such outline and position information is referred to as a feature quantity of level 3 in comparison with the above feature quantities (see Nonpatent Literature 2: Anil Jain, Yi Chen and Meltem Demirkus, "Pores and Ridges: High-Resolution Fingerprint Matching Using Level 3 Features", *IEEE TRANSACTIONS ON PATTERN ANALYSIS AND MACHINE INTELLIGENCE*, VOL. 29, NO. 1, pp. 15-27, JANUARY 2007).

An image processing method of generating a high-resolution image by synthesizing consecutive shots of a plurality of low-resolution images, which is generally referred to as super-resolution processing, has been suggested for application to a digital camera, etc (Patent Document 6: Japanese Laid-Open Patent Publication No. 2007-271690).

When a sweep fingerprint sensor is used for inputting a fingerprint image, operation of moving a finger and a sensor surface relative to each other is required at the time of inputting a fingerprint. Since acquiring the fingerprint depends on an operation method in this manner, an image of the whole fingerprint may not be acquired if the operation method by a user is not proper. In such a case, synthesizing a plurality of images does not produce the whole image but produces only the image of a partial area of the fingerprint (e.g., only a fingertip). When a flat fingerprint sensor is used for inputting a fingerprint image, for example, only the image of a partial area is produced if the way of pressing the user's finger is not proper to cause such a situation that the user's finger is not brought into contact with a sensor surface in a sufficient area. Even if a plurality of images are synthesized, therefore, only the image of a partial area of the fingerprint may be acquirable. In other words, using a small-sized fingerprint sensor may lead to a disadvantageous case where a sufficient capability of distinguishing a person from another person may not be acquired when the user's operation method is not proper.

In the method using the outline of a fingerprint ridgeline and position information on a sweat gland pore, a feature quantity of level 3 is acquired as described above. The method, therefore, requires a fingerprint sensor having a high-resolution (about 1000 dpi or higher), and incorporating such a fingerprint sensor into a small-sized information equipment is difficult because of problems of price and mounting size.

According to the super-resolution processing (Patent Document 6) carried out by a digital camera etc., an amount of positional shift between low-resolution images is detected at a precision of magnitude of smaller than one pixel, and the low-resolution images are synthesized in accordance with the detected amount of positional shift. On a fingerprint image, an overall positional shift occurs due to the extension/contraction of skin. Because of this, even if position matching is successful in a partial area between images, the same position matching is not successful in other areas. Hence the super-resolution processing used in a digital camera cannot be applied directly to the fingerprint image.

Patent Documents 1 to 6 and Nonpatent Literatures 1 and 2 present no disclosure or suggestion related to the above requirements and problems and no disclosure or suggestion about a configuration etc., that solve the problems.

SUMMARY

According to an aspect of embodiments of the present invention, a fingerprint image acquiring device including a fingerprint image input unit to which fingerprint images are input consecutively; an image correlating unit to correlate a plurality of fingerprint images input from the fingerprint image input unit, the image correlating unit matching the input fingerprint images in position; a resolution enhancing determining unit to determine whether an area making resolution enhancing possible is present by detecting an area overlapping between fingerprint images as a result of image correlating and estimating similarity between the fingerprint images; an image synthesizing unit to synthesize the fingerprint images based on a result of the position matching by the image correlating unit; and a resolution enhancing unit to enhance a resolution of the area making resolution enhancing possible in the fingerprint image, wherein a fingerprint image is generated by partially enhancing the fingerprint image input to the fingerprint image input unit in resolution.

According to the configuration of such fingerprint image acquiring device, a resolution enhancing process is carried out on an area making resolution enhancing possible in a plurality of consecutively input low resolution fingerprint images to acquire a fingerprint image that is partially or wholly enhanced in resolution. A feature quantity can be extracted from such a fingerprint image, so that the precision of feature quantity extraction is improved.

According to another aspect of embodiments of the present invention, a fingerprint authenticating apparatus including: a fingerprint image input unit to which fingerprint images are input consecutively; an image correlating unit to match a plurality of fingerprint images in position; a resolution enhancing determining unit to determine whether an area making resolution enhancing possible is present by detecting an area overlapping between fingerprint images as a result of image correlating and estimating similarity between the fingerprint images; an image synthesizing unit to synthesize the fingerprint images based on a result of the position matching by the image correlating unit; a resolution enhancing unit to enhance a resolution of the area making resolution enhancing possible in the fingerprint image; a feature information generating unit to generate feature information from a fingerprint image enhanced in resolution by the resolution enhancing unit; and a fingerprint verification unit to verify acquired feature information with pre-registered feature information.

According to the configuration of such fingerprint image acquiring device, the resolution enhancing process is carried out on an area making resolution enhancing possible in a plurality of consecutively input low resolution fingerprint images to acquire a fingerprint image that is partially or wholly enhanced in resolution. A feature quantity is extracted from such a fingerprint image to carry out fingerprint verification, so that the precision of fingerprint verification is improved.

According to another aspect of embodiments of the present invention, a fingerprint image acquiring method including: consecutively taking in fingerprint images; matching a plurality of fingerprint images in position; determining whether an area making resolution enhancing possible is present by detecting an area overlapping between fingerprint images as a result of image correlating and estimating similarity between the fingerprint images; synthesizing the fingerprint images based on a result of the position matching; and enhancing a resolution of the area making resolution enhancing possible in the fingerprint image, wherein a fingerprint image is generated by partially enhancing the consecutively input fingerprint images in resolution. According to the above fingerprint image acquiring method, as described in an aspect of the invention, a fingerprint image enhanced in resolution can be acquired.

According to another aspect of embodiments of the present invention, a fingerprint authenticating method including: consecutively taking in fingerprint images; matching a plurality of fingerprint images in position; determining whether an area making resolution enhancing possible is present by detecting an area overlapping between fingerprint images as a result of image correlating and estimating similarity between the fingerprint images; synthesizing the fingerprint images based on a result of the position matching; enhancing a resolution of the area making resolution enhancing possible in the fingerprint image; generating feature information from a synthesized image enhanced in resolution; and verifying acquired feature information with pre-registered feature information. According to the above fingerprint authenticating method, as described in another aspect of the invention, a feature quantity extracted from a fingerprint image enhanced in resolution is used to improve the precision of fingerprint authentication.

According to another aspect of embodiments of the present invention, a computer-readable recording medium having recorded thereon a fingerprint image acquiring program to be executed by a computer, the program including: consecutively taking in fingerprint images; matching a plurality of fingerprint images in position; determining whether an area making resolution enhancing possible is present by detecting an area overlapping between fingerprint images as a result of image correlating and estimating similarity between the fingerprint images; synthesizing the fingerprint images matched in position based on a result of the position matching; and enhancing a resolution of the area making resolution enhancing possible in the fingerprint image, wherein a fingerprint image is generated by partially enhancing the fingerprint images consecutively input by the computer in resolution.

According to another aspect of embodiments of the present invention, a computer-readable recording medium having recorded thereon a fingerprint authenticating program to be executed by a computer, the program including: consecutively taking in fingerprint images; matching a plurality of fingerprint images in position; determining whether an area making resolution enhancing possible is present by detecting an area overlapping between fingerprint images as a result of image correlating and estimating similarity between the fingerprint images; synthesizing the fingerprint images matched in position based on a result of the position matching; enhancing a resolution of the area making resolution enhancing possible in the fingerprint image; generating feature information from a synthesized image enhanced in resolution; and verifying acquired feature information with pre-registered feature information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

A Other objects, features, and advantages of the present invention will be better understood by referring to the accompanying drawings and embodiments.

BRIEF DESCRIPTION OF THE DRAWINGS

FIGS. 10A-11D are diagrams of a process of enhancing a fingerprint image in resolution;
FIGS. 11A-11B are diagrams of a process of partially enhancing a fingerprint image in resolution.

DESCRIPTION OF EMBODIMENTS

In this embodiment, whether resolution enhancing is possible is determined for each area of a fingerprint image using a feature quantity that can be extracted from the fingerprint image acquired by a low-resolution fingerprint sensor, and a resolution enhancing process is carried out on an area making resolution enhancing possible to give the area a higher resolution, and then a feature quantity present in the fingerprint image is extracted. A feature quantity is thus extracted from a fingerprint image enhanced in resolution by the resolution enhancing process to carry out fingerprint authentication using the extracted feature quantity.

First Embodiment

Figure 1:
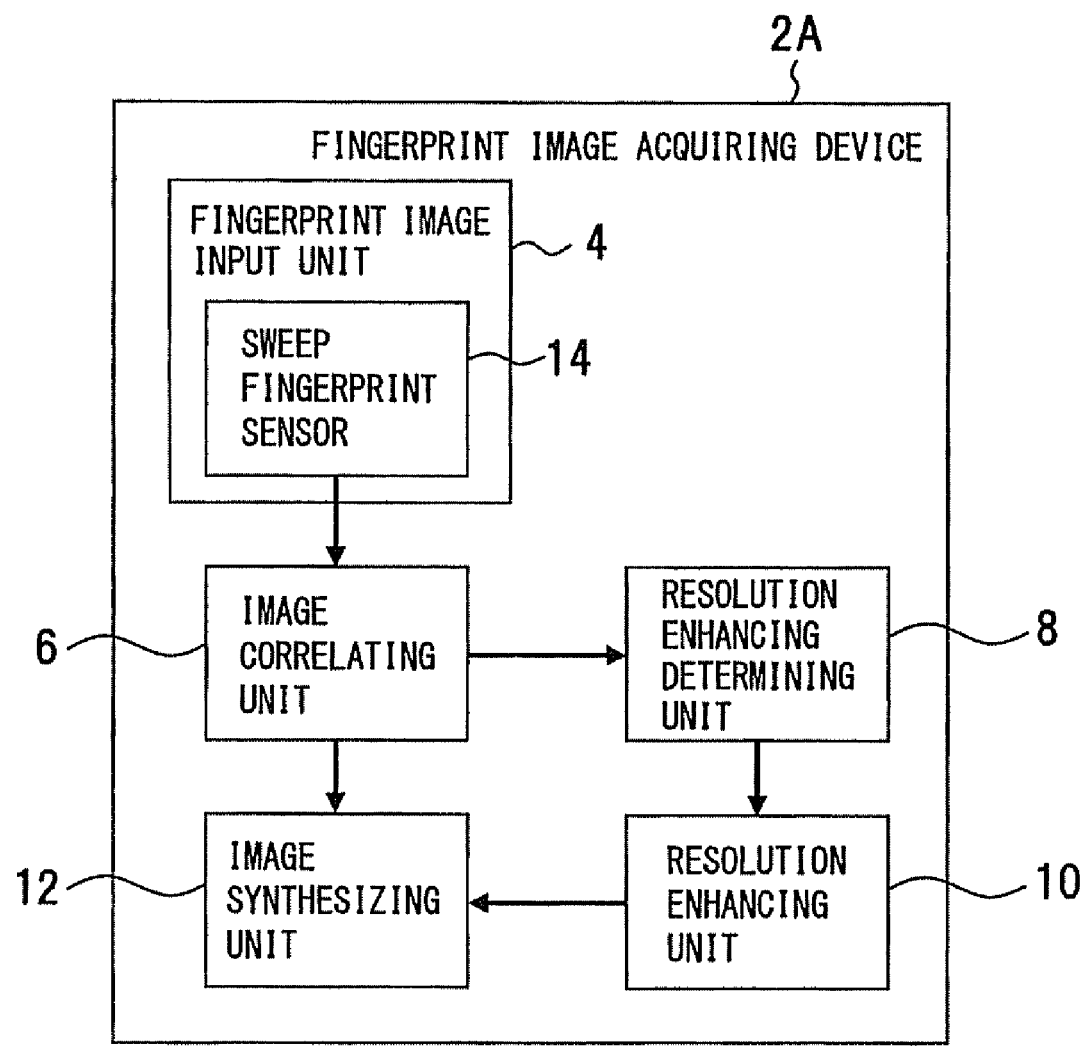
FIG. 1 is a block diagram of a fingerprint image acquiring device of a first embodiment.
Figure 2:
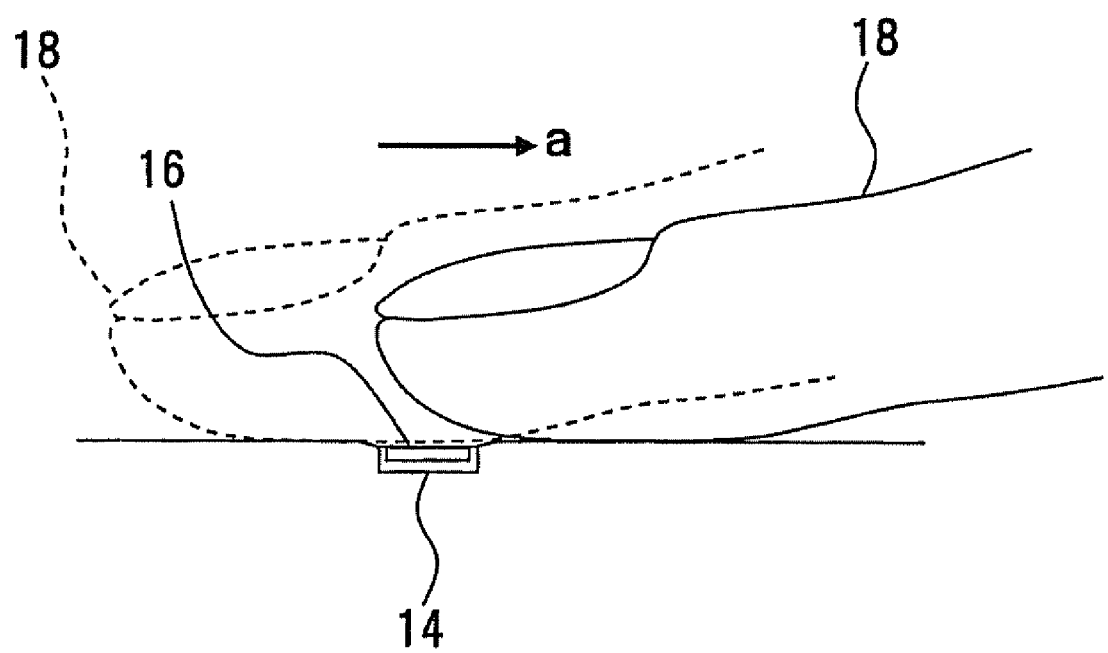
FIG. 2 is a diagram of an example of a sweep fingerprint sensor.
Figure 3:
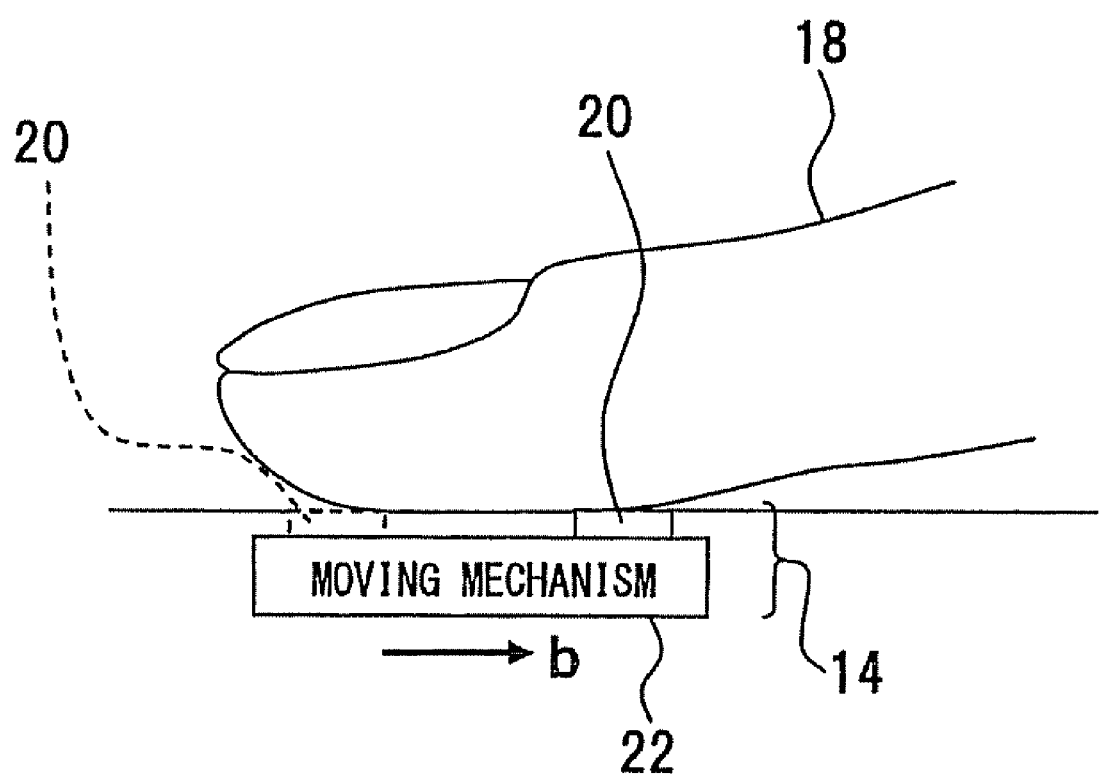
FIG. 3 is a diagram of another sweep fingerprint sensor.
Figure 4:
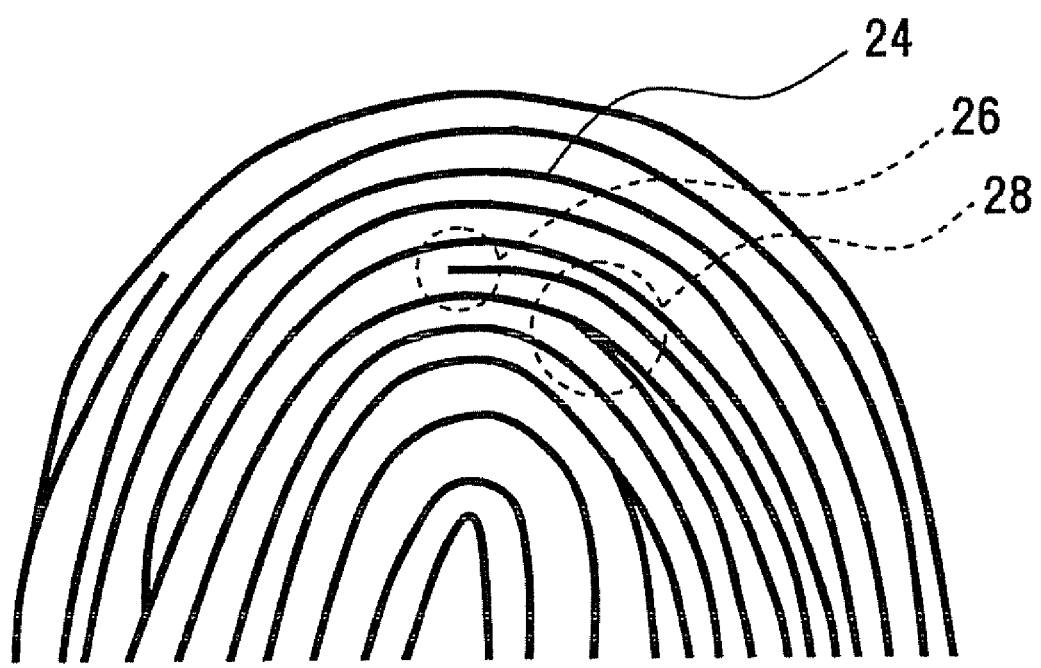
FIG. 4 is a diagram of a feature quantity of a fingerprint.
Figure 5:
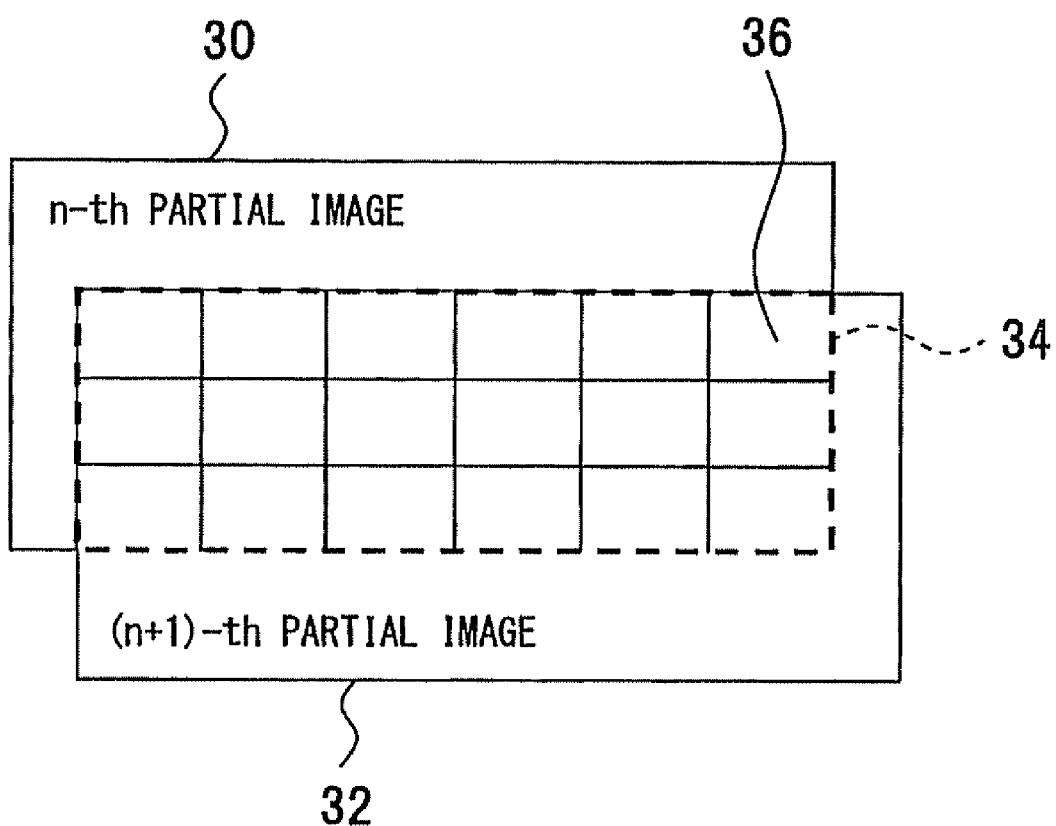
FIG. 5 is a diagram of detection and division of an overlapping area of partial images of a fingerprint image.
Figure 6:
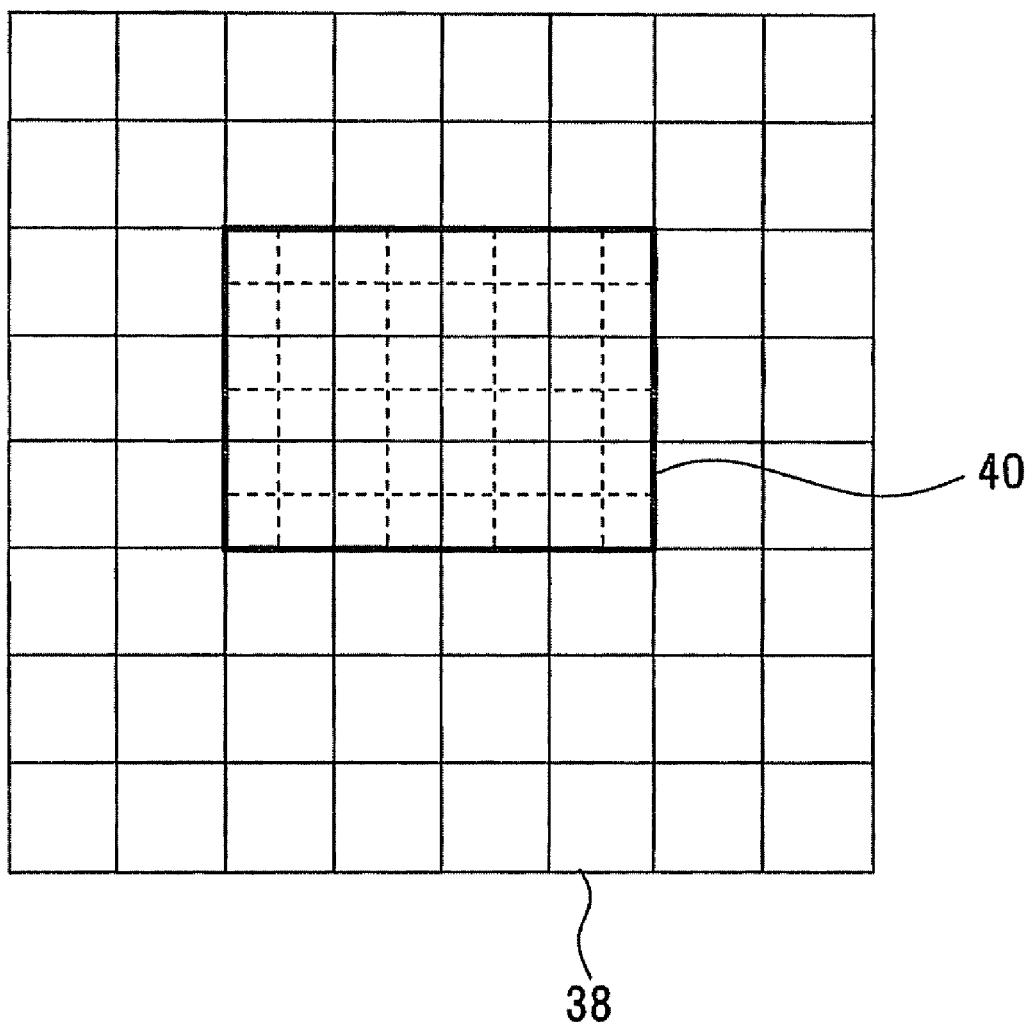
FIG. 6 is a diagram of a synthesized image generated from a plurality of fingerprinting images.
Figure 7:
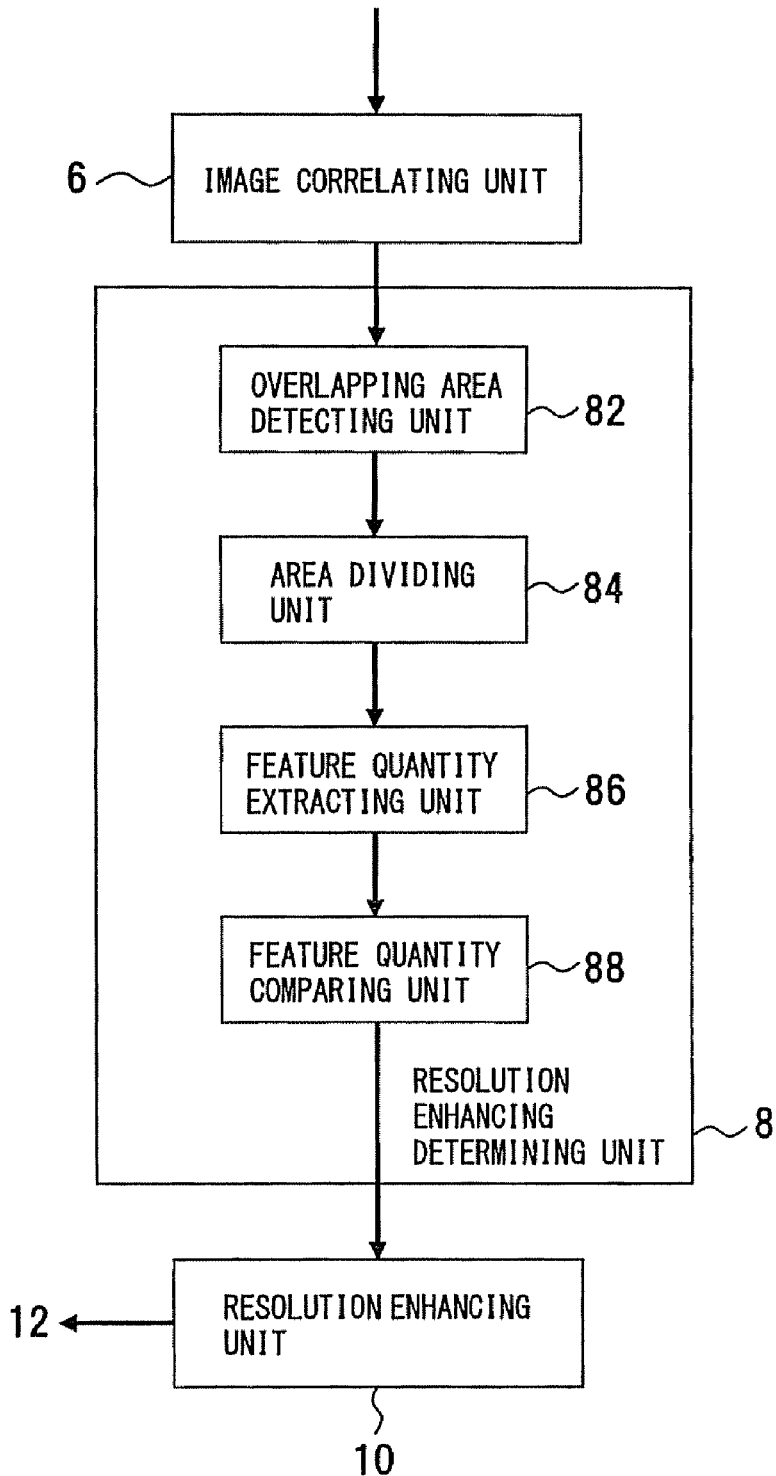
FIG. 7 is a diagram of a configuration example of a resolution enhancing determining unit.

A first embodiment is described with reference to FIGS. 1, 2, 3, 4, 5, 6, and 7. FIG. 1 is a block diagram of a fingerprint image acquiring device, FIGS. 2 and 3 depict examples of a sweep fingerprint sensor, FIG. 4 depicts a feature quantity of a fingerprint, FIG. 5 depicts detection and division of an overlapping area of partial images of a fingerprint image, FIG. 6 depicts a synthesized image, and FIG. 7 depicts a configuration example of a resolution enhancing determining unit. Configurations of FIGS. 1 to 7 are presented as examples, and therefore the present invention is not limited by such configurations.

This fingerprint image acquiring device 2A uses a sweep fingerprint sensor for acquiring a fingerprint image. As depicted in FIG. 1, the fingerprint image acquiring device 2A includes a fingerprint image input unit 4, an image correlating unit 6, a resolution enhancing determining unit 8, a resolution enhancing unit 10, and an image synthesizing unit 12. In this embodiment, a sweep fingerprint sensor 14 is used as the fingerprint image input unit 4.

The fingerprint image input unit 4 is an example of a fingerprint image input means (unit) that turns fingerprint input by a user into an image to intermittently detect a plurality of partial images. Fingerprint detecting methods carried out by the sweep fingerprint sensor 14 working as a biometric information input means include, for example, a capacitive sensing method, a heat-sensitive method, an electric field method, and an optical method. The sweep fingerprint sensor 14 may carry out any one of these methods. Fingerprint reading may be carried out in such a way as depicted in FIG. 2 that the user moves a finger 18 toward its base, specifically, from the vicinity of the first joint to the fingertip, for example, in an arrowed direction a while touching a sensor surface 16 of the sweep fingerprint sensor 14 with the finger 18. The sweep fingerprint sensor 14 may be provided with a moving mechanism 22 that moves a sensor unit 20 relative to the finger 18, as depicted in FIG. 3, in which case moving the sensor unit 20 in an arrowed direction b eliminates a need for the user to move the finger 18. An existing sweep fingerprint sensor can be used as the sweep fingerprint sensor 14, so that the detailed description of the sweep fingerprint sensor 14 will be omitted. In response to the above move of the finger, the sweep fingerprint sensor 14 consecutively reads two-dimensional images to acquire a plurality of partial images.

In this manner, the sweep fingerprint sensor 14 acquires a plurality of partial images through the sweeping move of the finger 18, which partial images are buffered and saved in the fingerprint image input unit 4.

The image correlating unit 6 is a calculating means that calculates an amount of shift between partial images, and also serves as an image correlating means (unit) that restructures an image of the whole finger. This image correlating unit 6 carries out comparison between adjacent partial images among a plurality of partial images input to the fingerprint image input unit 4 and determines a relative positional relation in which an overlapping area between the partial images are most similar to each other to calculate an amount of shift. When an area in which images overlap is present on the boundary between adjacent partial images, an image of the whole fingerprint can be restructured by image synthesis. If, however, the speed of operation of the finger is too high compared to the speed of reading operation by the sweep fingerprint sensor 14 in its width in the direction of operation of the finger, an overlapping area is not generated, so that partial images accompanying the overlapping area cannot be synthesized. Comparison between partial images may be carried out using the images themselves, or may be carried out using feature quantities extracted from the images, such as a ridgeline pattern 24 and feature points 26 and 28 depicted in FIG. 4. The feature point 26 is an endpoint, and the feature point 28 is a branch point. Being short in its vertical width, the sweep fingerprint sensor 14 has difficulty in acquiring a feature point. Combined use of images themselves and ridgeline patterns is, therefore, desirable when an image of the whole fingerprint is restructured using the sweep fingerprint sensor 14.

The resolution enhancing determining unit 8 is a resolution enhancing determining means (unit) that detects an overlapping area as a result of correlating partial images to divide the overlapping area into small areas of block shapes (FIG. 5), and that calculates a similarity level between partial images for each small area to compare the calculated similarity level with a given threshold and determine whether resolution enhancing is possible. For example, when a similarity level is high in a small area, resolution enhancing is determined to be possible if the similarity level is equal to or higher than the given threshold.

The resolution enhancing determining unit 8 carries out the process of detecting an overlapping area, dividing the overlapping area into small areas, etc., in such a way as depicted in FIG. 5 that when an overlapping area 34 is formed between a n-th partial image 30 and a (n+1)-th partial image 32, the overlapping area 34 is detected and is divided into a plurality of areas (small areas) 36 each smaller than the overlapping area 34.

The resolution enhancing unit 10 is a means that receives an amount of shift and information of an area determined to be an area making resolution enhancing possible (the upper left coordinate, vertical width, and lateral width of each partial image) to determine a processing range in each partial image. An amount of positional shift in the processing range is determined at precision of decimal pixels. Methods of determining an amount of positional shift at precision of decimal pixels include a method of generating a pixel value at a decimal pixel position in each pixel by linear interpolation etc., and then calculating a similarity level and a method of estimating an amount of positional shift at precision of decimal pixels based on a similarity level calculated at an integer pixel position. The resolution enhancing unit 10 superposes images in the corresponding processing ranges in partial images while considering an amount of positional shift determined at precision of decimal pixels, carries out the pixel value interpolation process, and generates a high-resolution image of each object. The interpolation process is carried out as a known interpolation process, and therefore is not described further. The above process is carried out on all areas determined to be areas making resolution enhancing possible.

The image synthesizing unit 12 synthesizes partial images based on an amount of shift. The image synthesizing unit 12 converts the resolution of a synthesized image to adjust the converted resolution to the resolution of a high-resolution image. Based on the amount of shift and area information, the image synthesizing unit 12 then disposes the high-resolution image on the synthesized image to generate a synthesized image 38 (FIG. 6) partially enhanced in resolution. On this synthesized image 38, a high-resolution area 40 is formed, as depicted in FIG. 6.

Such a process is repeated in order of partial images buffered in the fingerprint image input unit 4 to generate a synthesized image of the whole fingerprint.

As referred to FIG. 7, the resolution enhancing determining unit 8 includes an overlapping area detecting unit 82, an area dividing unit 84, a feature quantity extracting unit 86, and a feature quantity comparing unit 88.

The overlapping area detecting unit 82 is a detecting means that receives correlating output from the image correlating unit 6 to detect an area where adjacent fingerprint images overlap, i.e., an overlapping area. The area dividing unit 84 is an area dividing means (unit) that receives a result of detection of an overlapping area from the overlapping area detecting unit 82 to divide the overlapping area into smaller areas. The feature quantity extracting unit 86 is a feature quantity extracting means (unit) that extracts a feature quantity present in the overlapping area. The feature quantity comparing unit 88 is a means that compares extracted feature quantities with each other. The resolution enhancing determining unit 8 thus divides an overlapping area between fingerprint images into small areas, estimates reproducibility between the fingerprint images for each smaller area, and determines whether resolution enhancing is possible as a result of the estimation. The resolution enhancing unit 10 receives the result of determination from the resolution enhancing determining unit 8 to carry out the resolution enhancing process on an area making resolution enhancing possible in the fingerprint image.

In this manner, the area dividing means is included as the means that divides a fingerprint image area by area, thus an overlapping area between fingerprint images is divided into small areas. This allows determining whether resolution enhancing is possible for each small area. As a result, even if a fingerprint image is partially distorted, only the area without distortion can be extracted from the fingerprint image to generate a high-resolution image, which improves the precision of fingerprint authentication to be described later.

Figure 8:
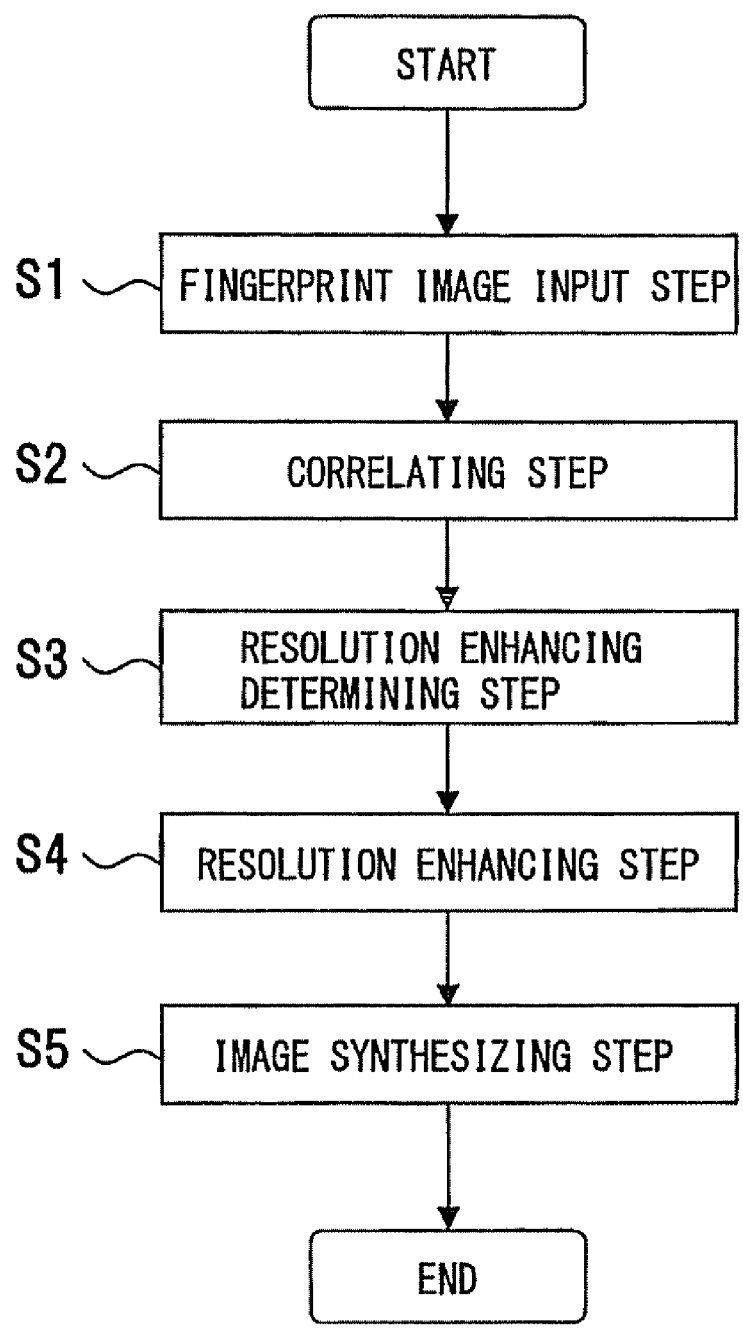
FIG. 8 is a flowchart of a procedure of acquiring a fingerprint image.
Figure 9:
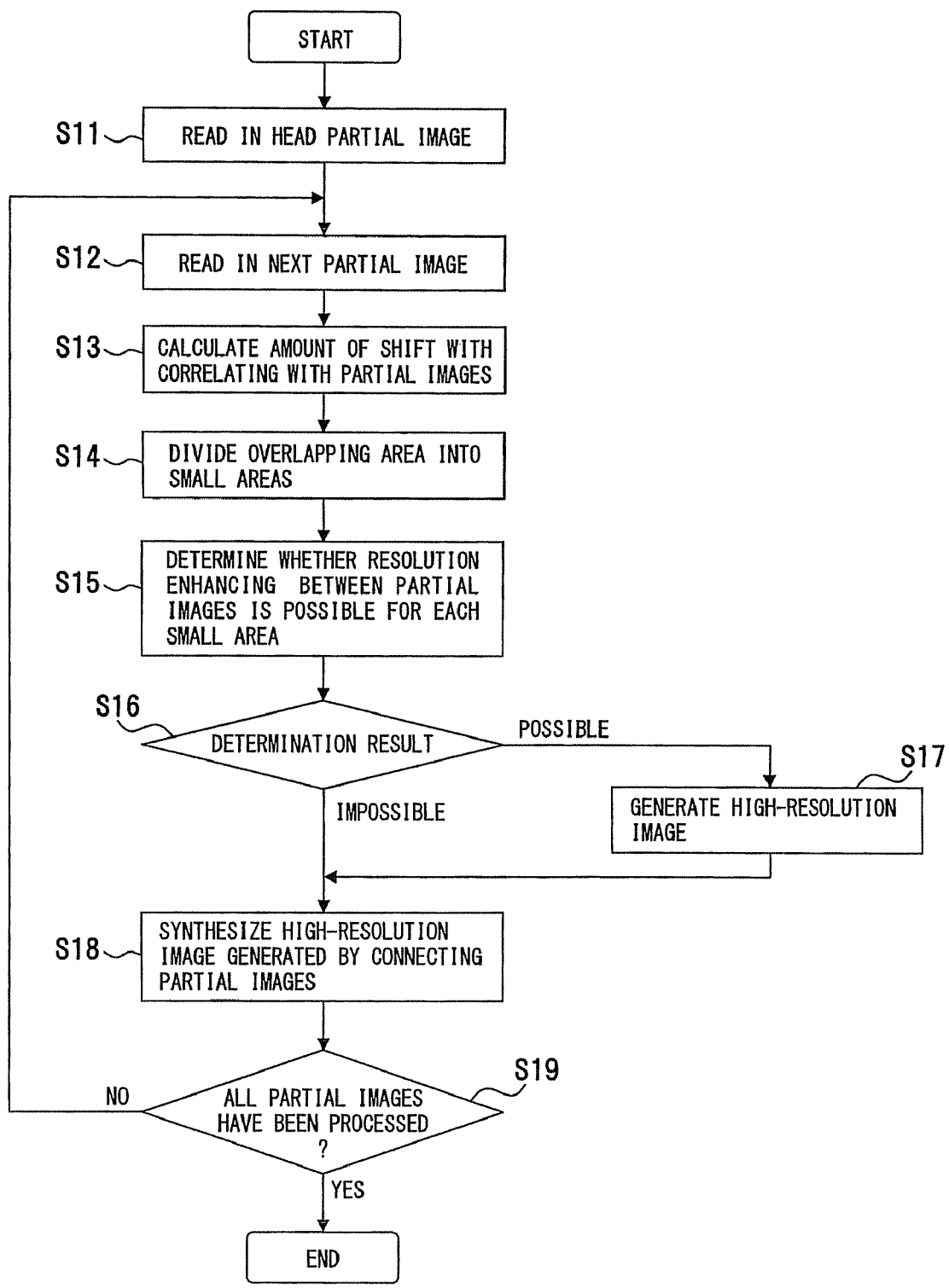
FIG. 9 is a flowchart of an example of a procedure of acquiring a fingerprint image.

A process of acquiring a fingerprint image and constructing an image is described with reference to FIGS. 8 and 9. FIGS. 8 and 9 are flowcharts of a procedure of acquiring a fingerprint image. A configuration depicted by FIGS. 8 and 9 is presented as an example, and therefore the present invention is not limited by such a configuration.

This procedure is an example of a fingerprint image acquiring method or a fingerprint image acquiring program, and, as depicted in FIG. 8, is executed through a fingerprint image input step by the fingerprint image input unit 4 (step S1), a correlating step by the image correlating unit 6 (step S2), a resolution enhancing determining step by the resolution enhancing determining unit 8 (step S3), a resolution enhancing step by the resolution enhancing unit 10 (step S4), and an image synthesizing step by the image synthesizing unit 12 (step S5).

In this procedure, as depicted in FIG. 9, the head partial image of a finger is read in (step S11), and the next partial image is read in (step S12). These partial images are correlated with each other to calculate an amount of shift (step S13), and an overlapping area is divided into small areas (step S14). Whether resolution enhancing between the partial images is possible is determined for each small area (step S15). When a determination result (step 16) is that resolution enhancing is possible, a high-resolution image is generated (step S17). When the determination result (step 16) is that resolution enhancing is impossible, a high-resolution image generated by connecting the partial images is synthesized (step S18). Whether all partial images have been processed is then determined (step S19). When all partial images have not been processed yet (NO at step S19), the procedure flow returns to step S12, from which all partial images are processed. When all partial images have been processed (YES at step S19), the procedure is ended.

The resolution enhancing process is described with reference to FIGS. 10A-10D. FIGS. 10A-10D depict a super-resolution process on a fingerprint image.

Figure 10A:
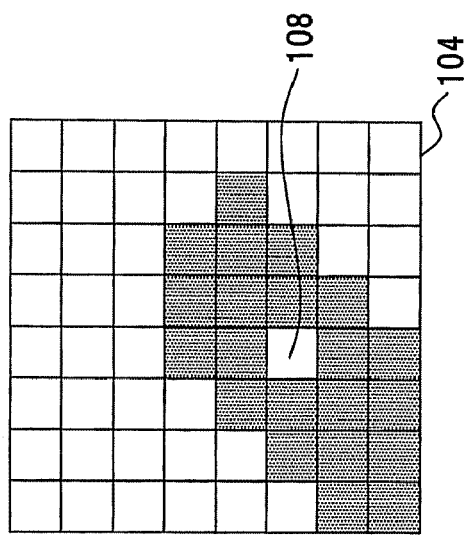
Figure 10B:
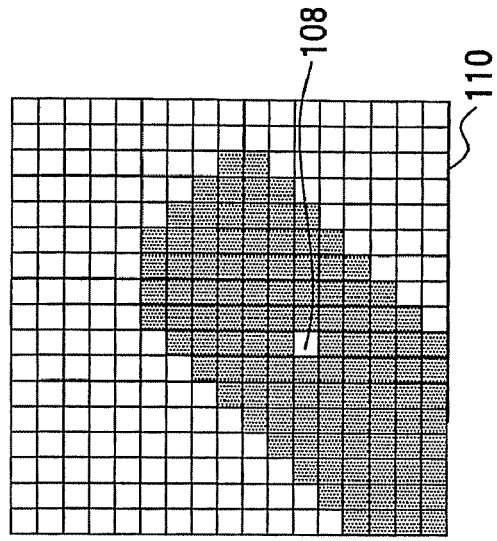
Figure 10C:
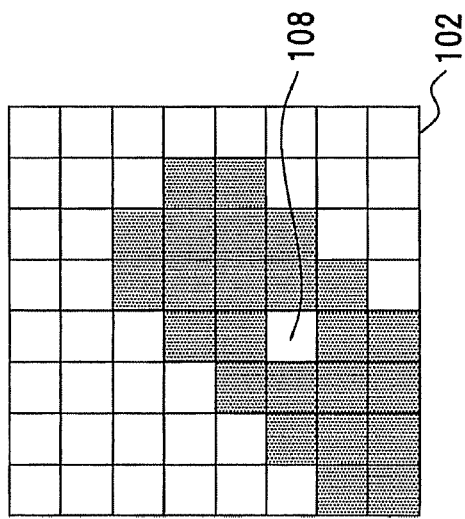
Figure 10D:
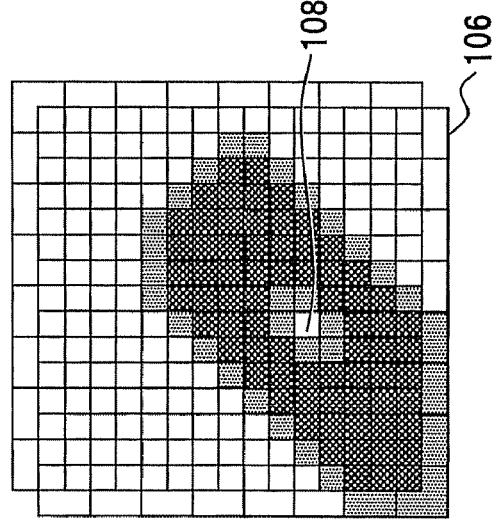

This resolution enhancing process is an example of a processing method for resolution enhancing or a processing program for resolution enhancing. A process of image interpolation using a plurality of images, e.g., super-resolution process can be employed for this resolution enhancing process. While a binary image is used in the example of FIGS. 10A-10D, a multi-value image may also be used. Position matching is carried out between a plurality of images (two images in FIGS. 10A-10D). In a partial area in a fingerprint image, for example, a fingerprint image 102 (image 1) of FIG. 10A and a fingerprint image 104 (image 2) of FIG. 10B are matched in position. As depicted in FIG. 10C, an image 106 is acquired as a result of position matching. 108 denotes a sweat gland pore in FIGS. 10A, 10B, and 10C. A verification process (feature point method, pattern matching method, etc.) used in fingerprint authentication may be carried out in this position matching process. In this position matching, a positional shift between images is determined in pixel values smaller than pixel values of the resolution of the original images. At each of pixels of an image having a resolution resulting from super-resolution, a pixel value is calculated from pixel values of the original two images that correspond to each other. In this example, when the pixel value of either of the original images is 1 (colored), the pixel value after super-resolution is determined to be 1. As a result, an image 110 after super-resolution is acquired, as depicted in FIG. 10D.

In use of another method, the average of pixels of both images may be calculated. By calculating pixel values for all pixels of an image after super-resolution, an image having a resolution higher than the resolution of the original images can be acquired.

A process of partial resolution enhancing is described with reference to FIGS. 11A-11B. FIGS. 11A-11B depict a process of partially enhancing a fingerprint image in resolution.

Because a distortion due to stamping is inevitably formed on a fingerprint image, applying the super-resolution process to the whole of an overlapping area resulting from position matching is difficult. For this reason, whether an area is an area making super-resolution possible is determined first, and then the super-resolution process is carried out on an area making super-resolution possible.

As depicted in FIG. 11A, an area with a high similarity level is selected in an overlapping area 116 between a fingerprint image 112 (image 1) and a fingerprint image 114 (image 2), and resolution conversion is carried out by synthesizing (super-resolution) the fingerprint image 112 (image 1) with the fingerprint image 114 (image 2) only in the selected area as resolution conversion is carried out by an ordinary interpolation process in the other area. As depicted in FIG. 11B, in an image 118 resulting from image synthesis, 120 represents the area subjected to resolution conversion by the super-resolution process and 122 represents the area subjected to image conversion by the ordinary interpolation process. In selection of the area with the high similarity level between the image 1 and the image 2, the area is divided into small areas, each of which is then subjected to a verification process to calculate a similarity level. A given threshold is set against the similarity level, and when the similarity level compared with the threshold is found to be larger than the threshold, a divided area is determined to be an area making super-resolution possible, which is then subjected to resolution conversion by super-resolution. In an area determined to be an area making super-resolution impossible inside the overlapping area, the corresponding pixel value may be calculated (average calculation etc.) using the two images or may be determined based on one of the two images. When a post-conversion pixel value is calculated from the corresponding pixel values of the two images, the original image pattern is changed. In a nonoverlapping area, resolution conversion only is carried out. In this case, the resolution is enhanced but the image pattern is merely expanded to remain as the same.

Figure 12:
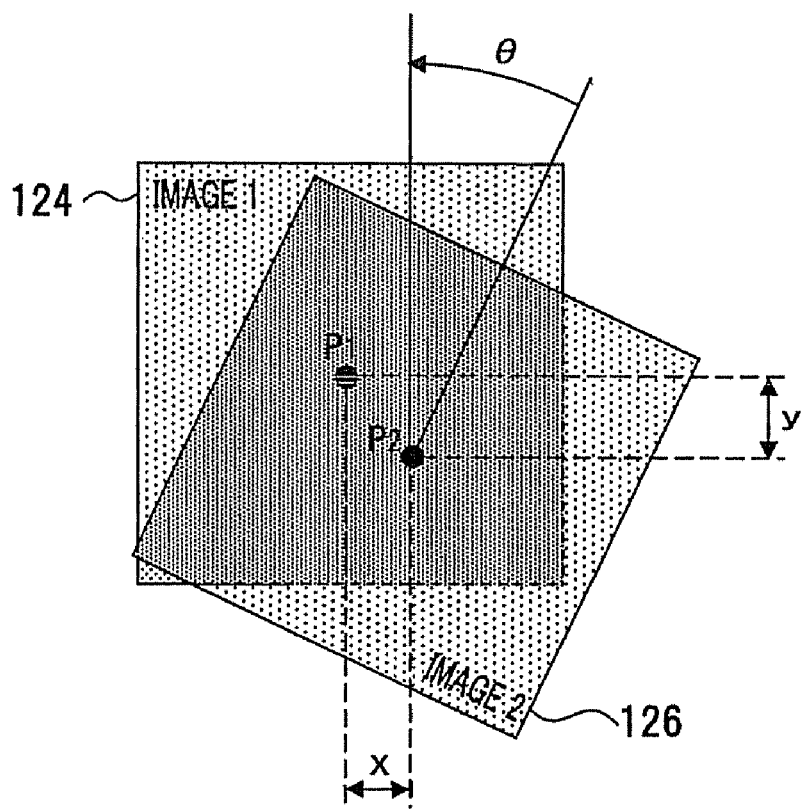
FIG. 12 is an explanatory diagram of an amount of shift between fingerprint images.

An amount of shift is described with reference to FIG. 12. FIG. 12 is an explanatory diagram of an amount of shift between fingerprint images.

As depicted in FIG. 12, when two images of, for example, an image 124 (image 1) and an image 126 (image 2) are matched in position, an amount of positional shift between a point P1 and a point P2 corresponding to each other between the images 124 and 126 (images 1 and 2) is determined to be an amount of shift between the images 124 and 126. This amount of shift is defined by an amount of shift x in the horizontal direction (X axis direction), an amount of shift y in the vertical direction (Y axis direction), and a rotation angle Θ. These values are used for correlating pixels at the time of image synthesis.

Second Embodiment

Figure 13:
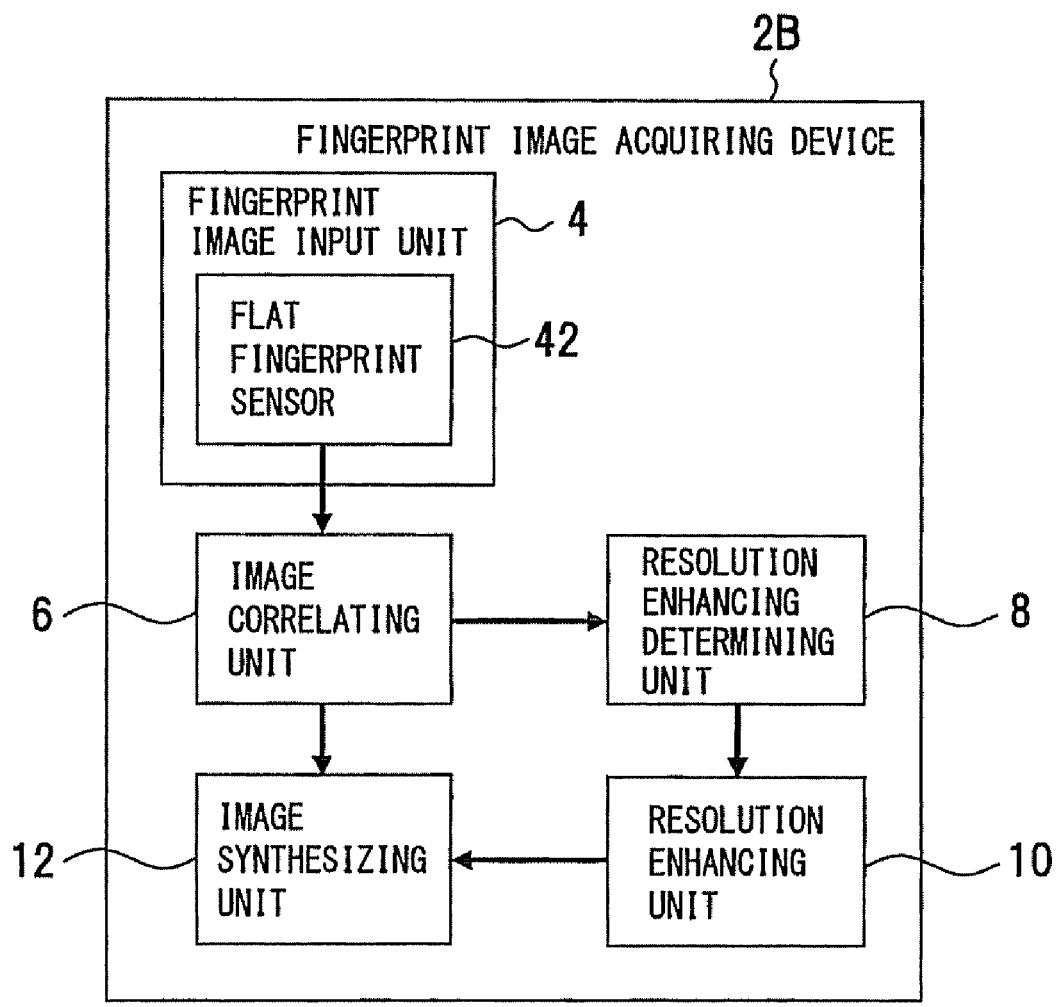
FIG. 13 is a block diagram of a fingerprint image acquiring device of a second embodiment.
Figure 14:
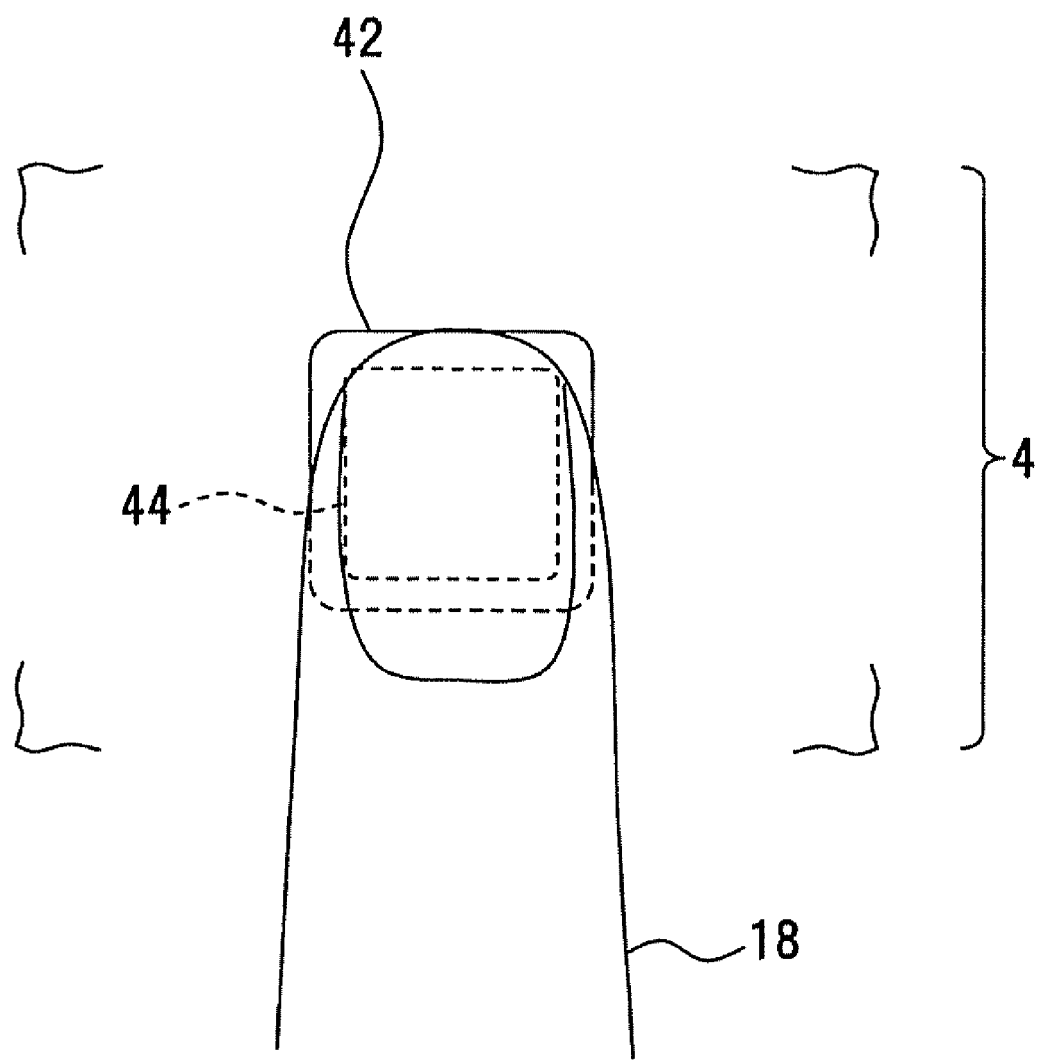
FIG. 14 is a diagram of an example of a flat fingerprint sensor.
Figure 15:
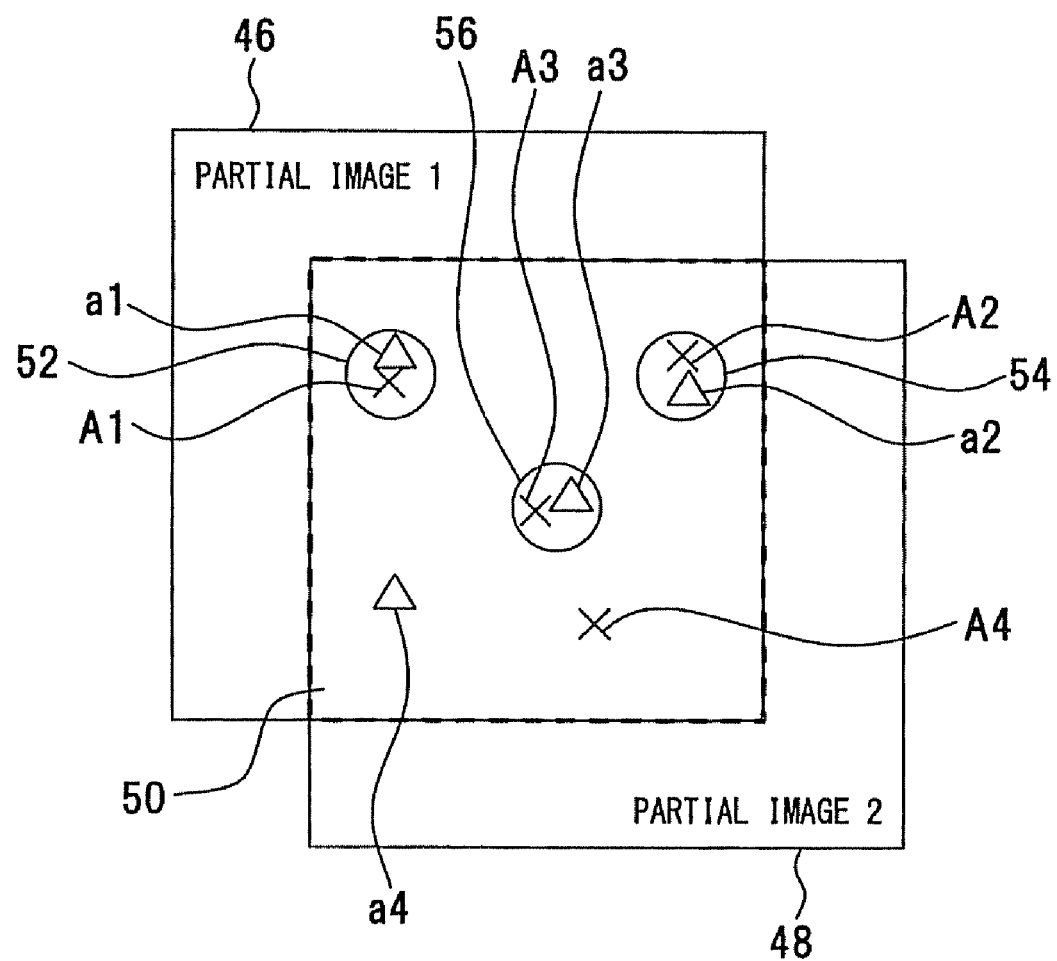
FIG. 15 is a diagram of correlating of feature points of fingerprint images.
Figure 16:
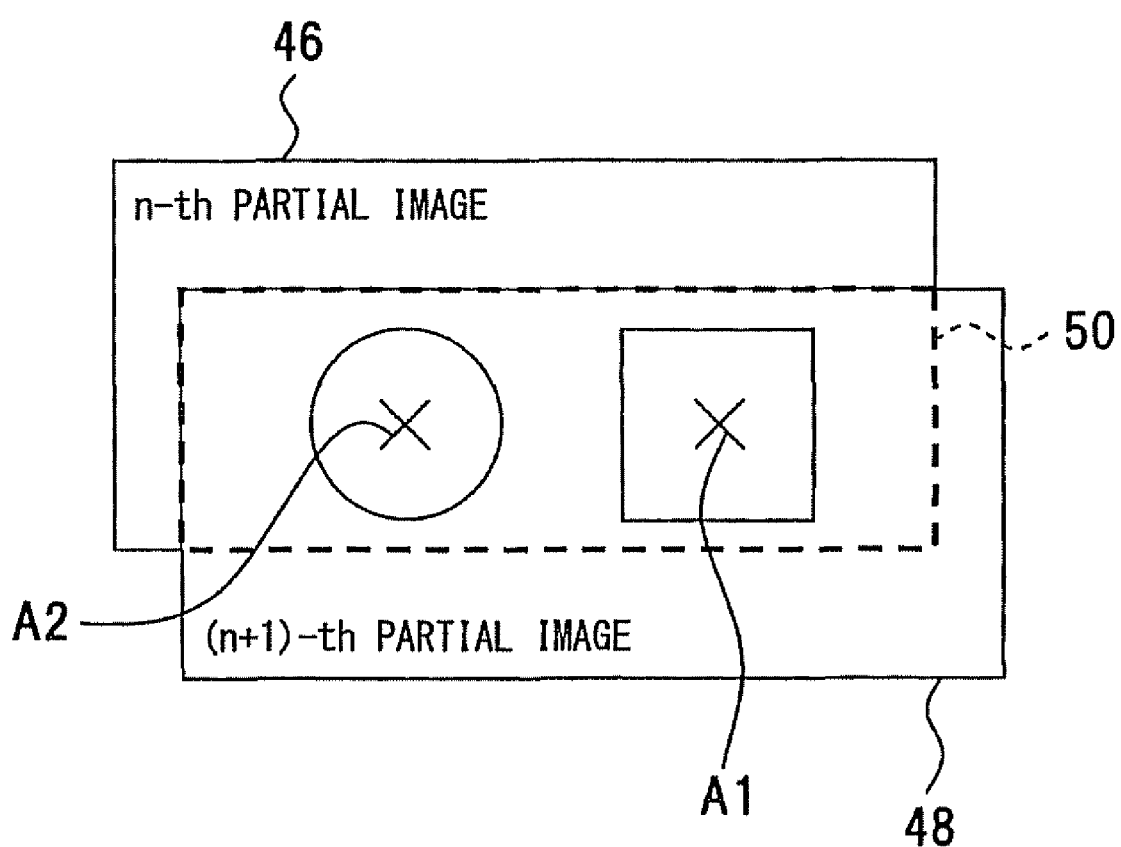
FIG. 16 is a diagram of detection and division of an overlapping area in partial images of a fingerprinting image.

A second embodiment is described with reference to FIGS. 13, 14, 15, and 16. FIG. 13 is a block diagram of a fingerprint image acquiring device, FIG. 14 depicts an example of a flat fingerprint sensor, FIG. 15 depicts correlating of feature points, and FIG. 16 depicts detection and division of an overlapping area of partial images. Configurations of FIGS. 13 to 16 are presented as examples, and therefore the present invention is not limited by such configurations. In FIGS. 13 and 14, the same components as the components of FIG. 1 are denoted by the same reference numerals.

This fingerprint image acquiring device 2B uses a flat fingerprint sensor for acquiring a fingerprint image. As depicted in FIG. 13, the fingerprint image acquiring device 2B includes the fingerprint image input unit 4, the image correlating unit 6, the resolution enhancing determining unit 8, the resolution enhancing unit 10, and the image synthesizing unit 12, as in the first embodiment. In this embodiment, a flat fingerprint sensor 42 is used as the fingerprint image input unit 4.

The fingerprint image input unit 4 serves as the fingerprint image input means, but requires a finger operating method different from that of the first embodiment because the flat fingerprint sensor 42 is used as the fingerprint image input unit 4. When a fingerprint is read, a user presses the user's finger to a sensor surface 44 of the flat fingerprint sensor 42, as depicted in FIG. 14. Through this operation, one partial image is acquired. Because a plurality of partial images are needed in the present invention, the user carries out fingerprint reading operation a plurality of times. Partial images input in this manner are buffered in the fingerprint image input unit 4.

In this input of a fingerprint image, the user may presses the finger to the sensor surface 44 of the flat fingerprint sensor 42 several times, or may keep pressing the finger to the sensor surface 44 while the fingerprint reading operation is carried out a plurality of times. A plurality of fingerprint images can be input even if the finger is not intently pressed to the sensor surface 44 several times but is kept placed on the sensor surface 44. In this embodiment, therefore, fingerprint image input can be carried out also in such a manner that image-taking (scanning) across the whole sensor surface 44 is carried out a plurality of times while the user's finger is kept in contact with the sensor surface 44 to input a plurality of fingerprint images. In the configuration for such an operation, even if the user tries to keep the user's finger in a constant state in fingerprint input, the pressure, position, etc., of the user's finger to the sensor surface 44 changes delicately as time lapses, so that a plurality of fingerprint images input at different times show delicate differences. If position matching is carried out using such a plurality of fingerprint images, a fingerprint image including a common area at a sufficiently large ratio can be acquired. In other words, a fingerprint image fit for highly precise personal authentication can be generated.

Because the sensor surface 44 of the fingerprint sensor 42 is of a fixed shape with a fixed area, a fingerprint image is taken as an image that is partially lopsided to the whole of the user's finger. When the sensor surface 44 has a sufficiently large area relative to the user's finger, fingerprint images with their major parts enhanced in resolution can be acquired at once, so that a fingerprint image including a feature point of a higher level can be acquired efficiently.

The image correlating unit 6 is the means that, for example, receives two partial images to compare the partial images with each other, and that determines a relative positional relation in which overlapping images in an overlapping area are most similar to each other to calculate an amount of shift. Two images may be selected in the order of input of images, or may be selected in accordance with a different selection criterion. The image correlating unit 6 thus determines a relative positional relation in which overlapping images in an overlapping area are most similar to each other and calculates an amount of shift. For comparison between partial images, the images themselves may be used or a feature quantity extracted from the images, such as a ridgeline pattern and a feature point, may be used. Different from the sweep fingerprint sensor 14, the flat fingerprint sensor 42 cannot narrow down the direction of move of a finger, which makes all direction scanning necessary. Use of a feature point requiring lighter calculation load is desirable in comparison of partial images. An image correlating method using a feature point is carried out by the same process as that of fingerprint verification using a feature point. The process is carried out in such a way that feature points extracted from partial images are verified with each other to determine an amount of shift in which the number of matching feature points becomes greater.

In the case of the flat fingerprint sensor 42, the resolution enhancing determining unit 8 makes a determination on resolution enhancing using both feature point and ridgeline pattern to reduce the effect of a distortion due to the extension/contraction of the skin that varies for every fingerprint reading operation. For this determination, a feature point present in an overlapping area is acquired. In this case, a feature point extracted by the image correlating unit 6 may be used for the determination or another feature point may be newly extracted. The resolution enhancing determining unit 8 thus carries out the fingerprint verification process in the same procedure as the image correlating procedure, using feature points acquired from partial images, and correlates matching feature points with each other (FIG. 15).

In correlating feature points, as depicted in FIG. 15, feature points A1, A2, A3, and A4 of a fingerprint image 46 (partial image 1) are compared with feature points a1, a2, a3' and a4 of a fingerprint image 48 (partial image 2), respectively, and matching feature points are correlated with each other as sets of feature points A1 and a1, A2 and a2, and A3 and a3 to determine an overlapping area 50. In this overlapping area 50, small areas 52, 54, and 56 represent correlating areas for the sets of feature points A1 and a1, A2 and a2, and A3 and a3, being divided as circular small areas 52, 54, and 56 based on the matching feature points A1 and a1, A2 and a2, and A3 and a3 as references. In this case, the radius of the circle is fixed or variable, and the size of the circle is desirably smaller than the size of the sensor surface 44. For example, the radius of the circle is fixed, and the ridgeline patterns 24 (FIG. 4) in the small areas 52, 54, and 56 in each partial image are extracted. Position matching is carried out at the reference points (center of the circle) of the corresponding small areas 52, 54, and 56 to compare the ridgeline patterns to calculate similarity levels, which are then compared to a given threshold to determine whether resolution enhancing is possible. In this determination process, the whole of the overlapping area 50 is not the subject of determination, but only the vicinities of the feature points A1 and a1, A2 and a2, and A3 and a3 that are indicated as characteristic areas are the subject of determination.

The resolution enhancing unit 10 receives an amount of shift and information of an area determined to be an area making resolution enhancing possible (the central coordinate and radius of a circle in each partial image) to determine a processing range in each partial image. An amount of positional shift in the processing range is determined at precision of decimal pixels. Methods of determining an amount of positional shift at precision of decimal pixels includes a method of generating a pixel value at a decimal pixel position in each pixel by linear interpolation, etc., and calculating a similarity level and a method of estimating an amount of positional shift at precision of decimal pixels based on a similarity level calculated at an integer pixel position. The resolution enhancing unit 10 superposes images in the corresponding processing ranges of partial images while considering an amount of positional shift determined at precision of decimal pixels, carries out the pixel value interpolation process, and generates a high-resolution image of each object. The interpolation process is carried out as a known interpolation process, and therefore is not described further. The above process is carried out on all areas determined to be areas making resolution enhancing possible.

The image synthesizing unit 12 synthesizes partial images based on an amount of shift. The image synthesizing unit 12 converts the resolution of a synthesized image to adjust the converted resolution to the resolution of a high-resolution image. Based on the amount of shift and area information, the image synthesizing unit 12 then disposes the high-resolution image on the synthesized image to generate a synthesized image partially enhanced in resolution.

Such a process is repeated in order of partial images buffered in the fingerprint image input unit 4 to generate a synthesized image of the whole fingerprint.

As depicted in FIG. 16, an area may be divided using a given shape based on the position of a feature point as a reference. In this case, the interior of the given shape is the subject of the determination, and a method of dividing a fingerprint image may be selected as a method that is fit to the type of a fingerprint sensor, which is the fingerprint image input means, or to a verification method.

Figure 17:
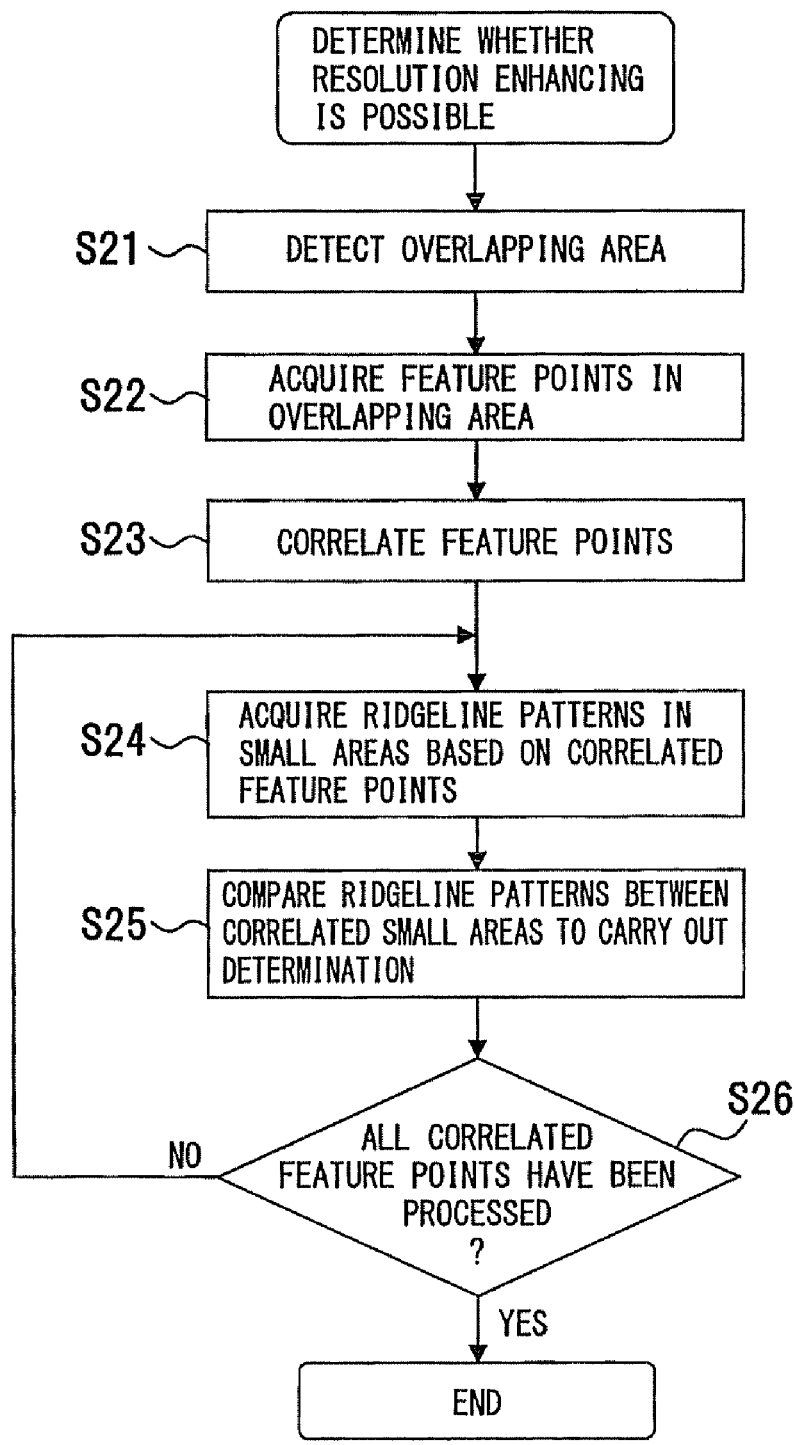
FIG. 17 is a flowchart of a procedure of determining resolution enhancing.

A process of determining resolution enhancing is described with reference to FIG. 17. FIG. 17 is a flowchart of a procedure of determining resolution enhancing. A configuration of FIG. 17 is presented as an example, and therefore the present invention is not limited by such a configuration.

In this embodiment, the processes of acquiring a fingerprint image and constructing an image are executed in the same manner as in the first embodiment, and the above procedure of acquiring a fingerprint image (FIGS. 8 and 9) is used.

The procedure of determining whether resolution enhancing is possible in this embodiment is an example of a method for the determination process or a program for the determination process. As depicted in FIG. 17, an overlapping area between partial images is detected (step S21), and feature points in the overlapping area are acquired (step S22) to correlate the feature points with each other (step S23). Based on the correlated feature points, ridgeline patterns in small areas are acquired (step S24), and the ridgeline patterns are compared with each other between small areas correlated with each other to carry out the determination (step S25). Whether all correlated feature points have been processed is determined (step S26). When all correlated feature points have not been processed yet (NO at step S26) the procedure returns to step S24. When all correlated feature points have been processed (YES at step S26), the procedure is ended.

Third Embodiment

Figure 18:
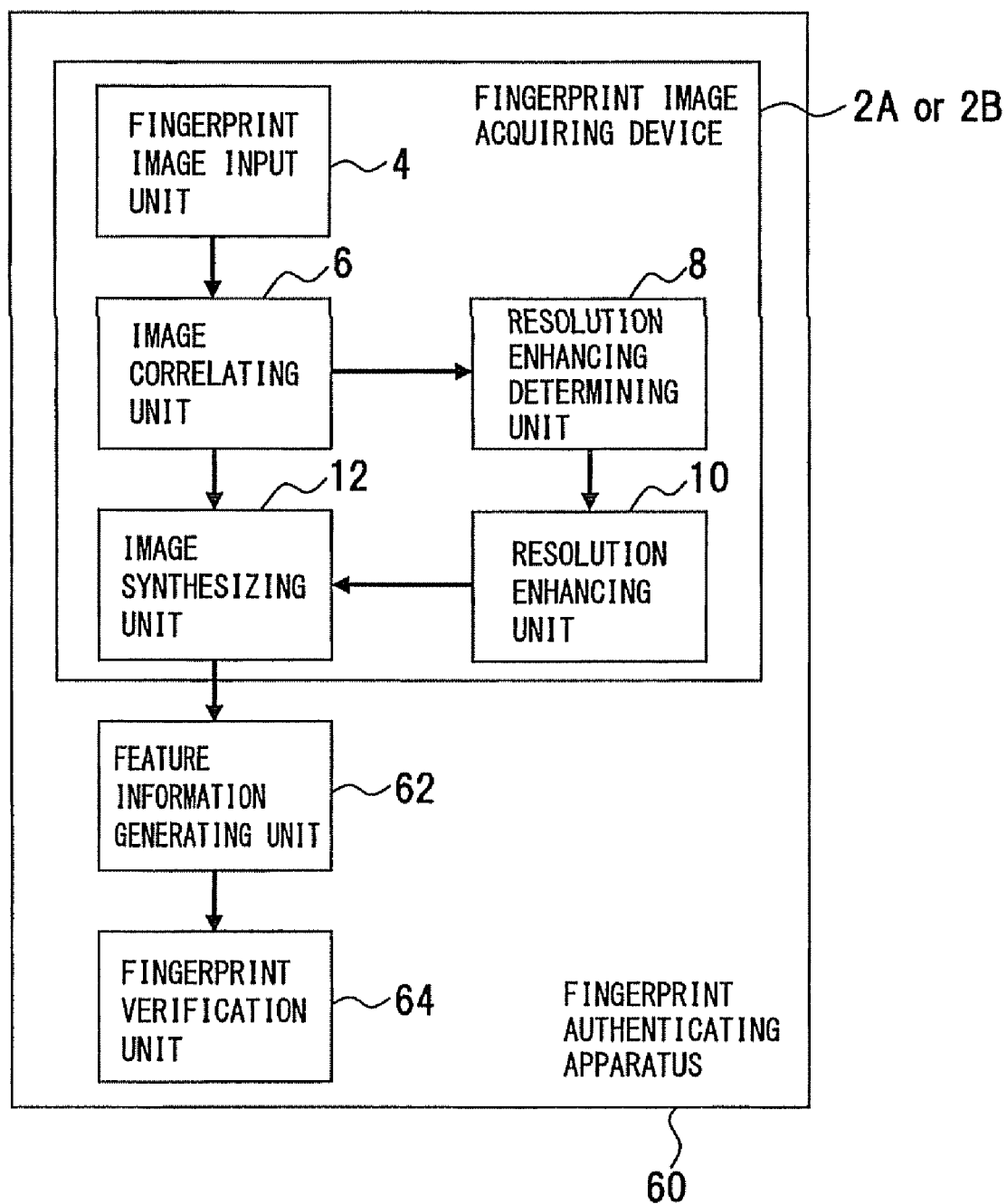
FIG. 18 is a diagram of a fingerprint authenticating apparatus of a third embodiment.
Figure 19:
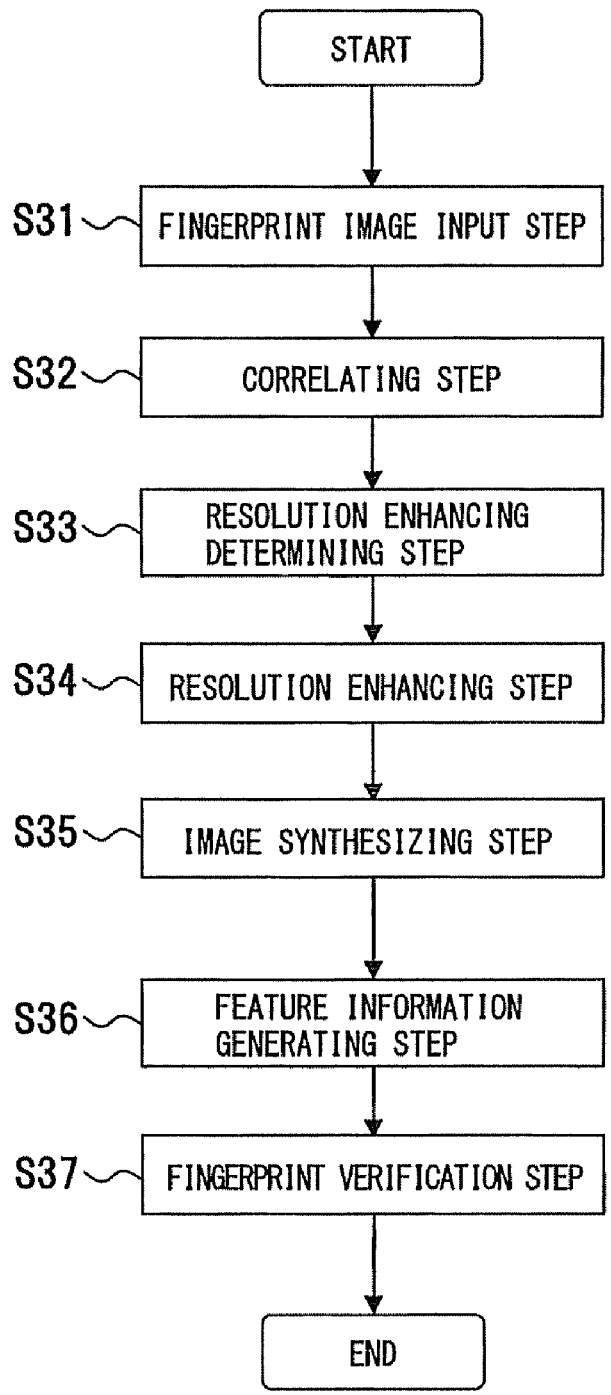
FIG. 19 is a flowchart of a procedure of fingerprint authentication.
Figure 20:
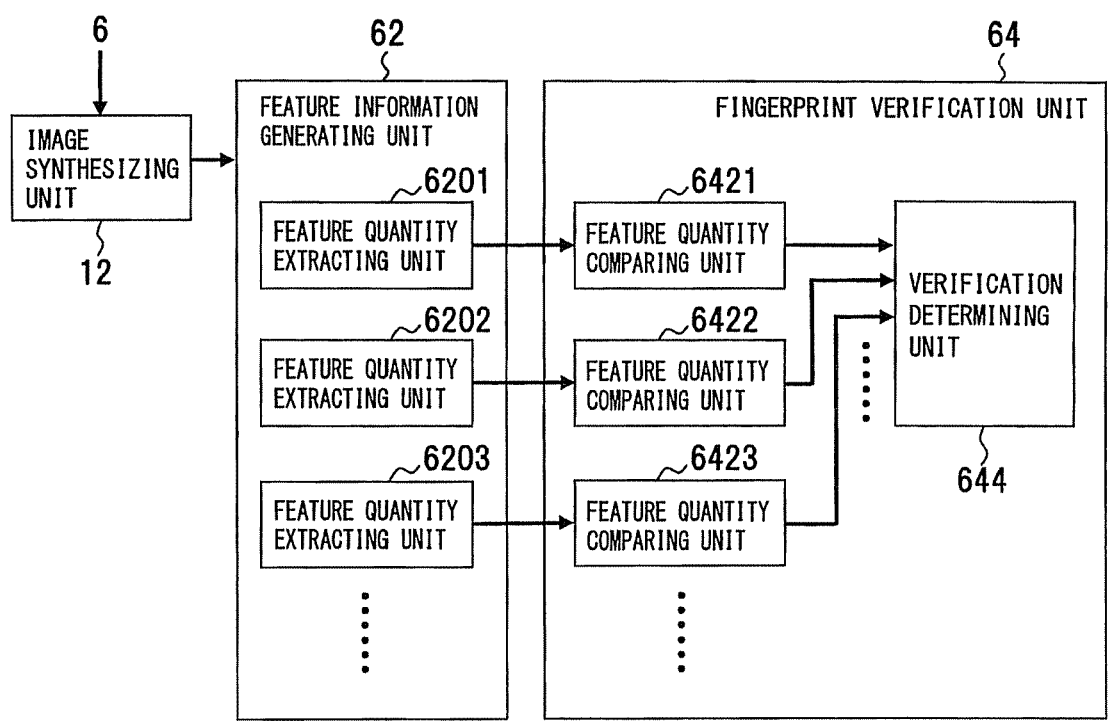
FIG. 20 is a diagram of a configuration example of a feature information generating unit and a fingerprint verification unit.
Figure 21:
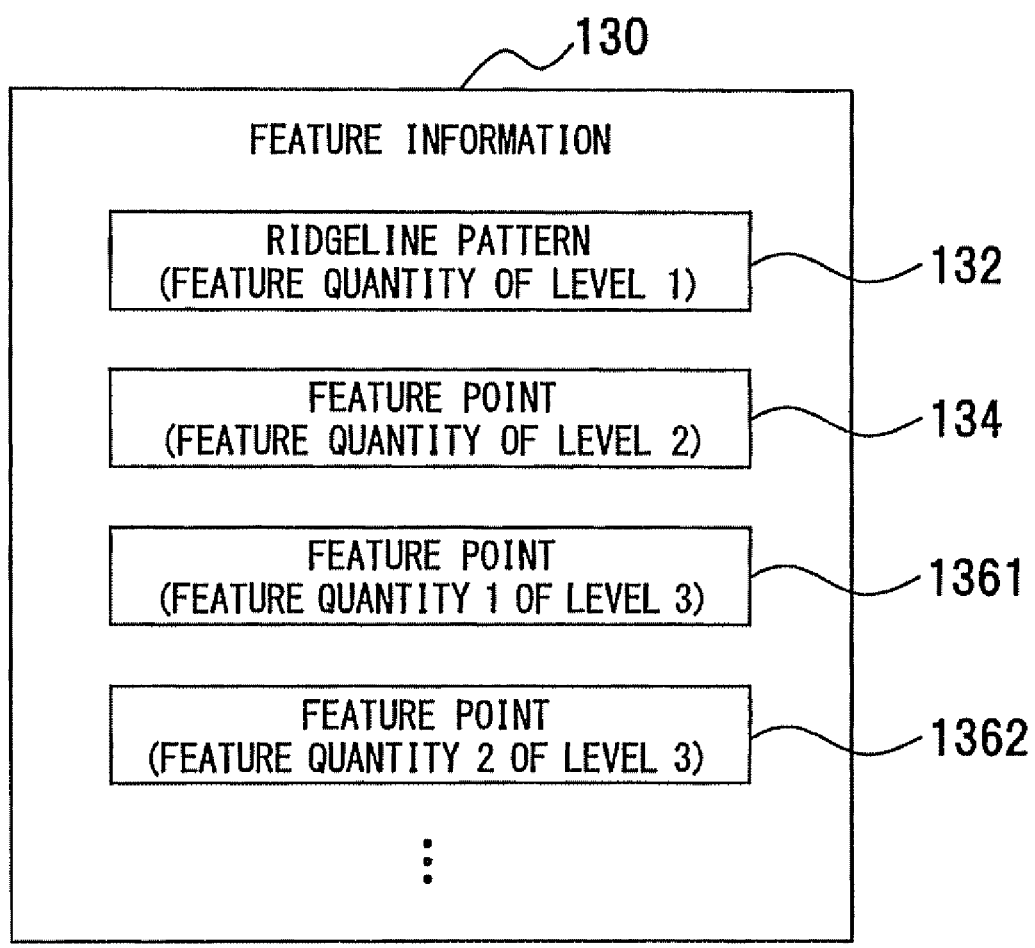
FIG. 21 is a diagram of a configuration of feature information.
Figure 22:
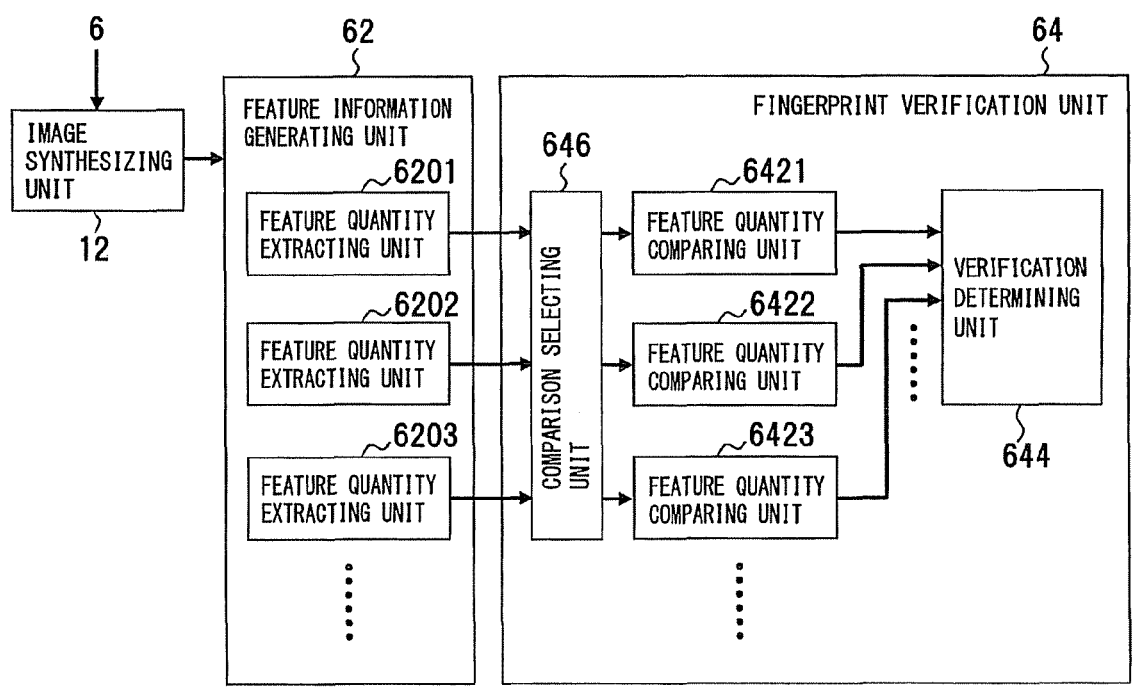
FIG. 22 is a diagram of another configuration example of the fingerprint verification unit.
Figure 23:
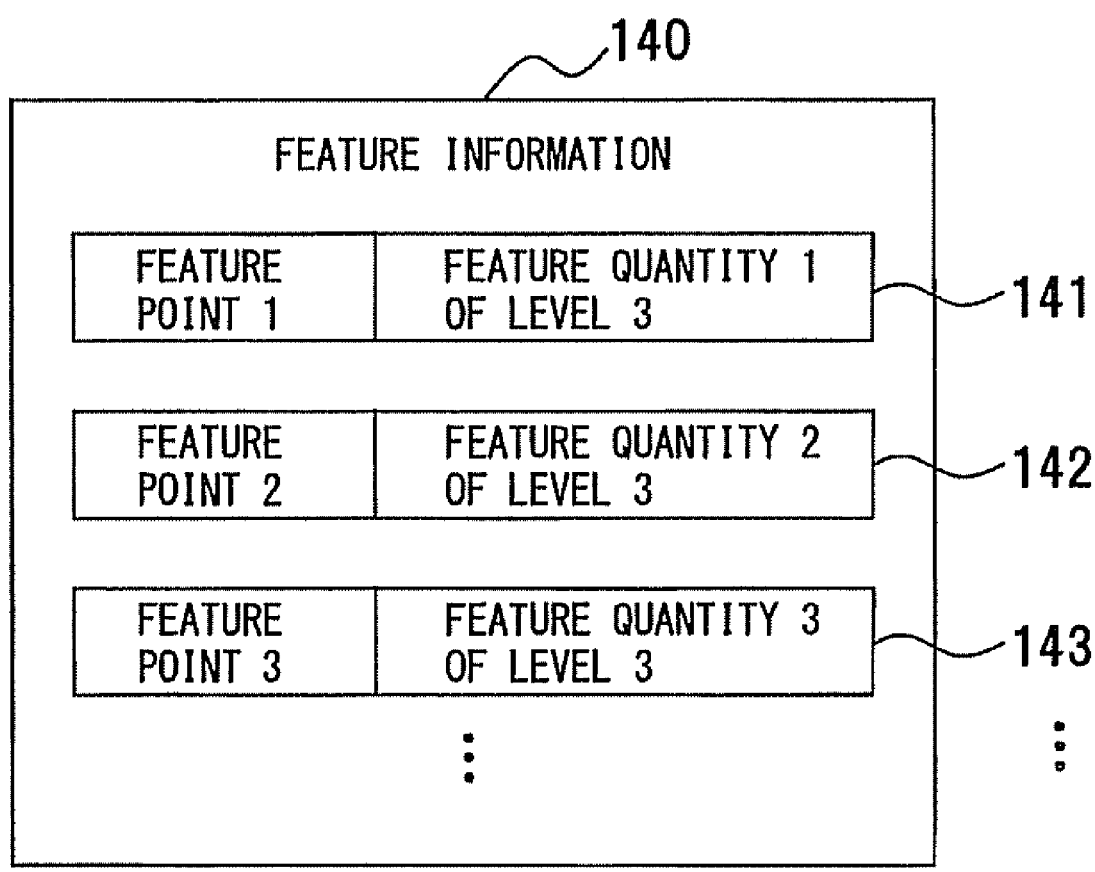
FIG. 23 is a diagram of a configuration of feature information.
Figure 24:
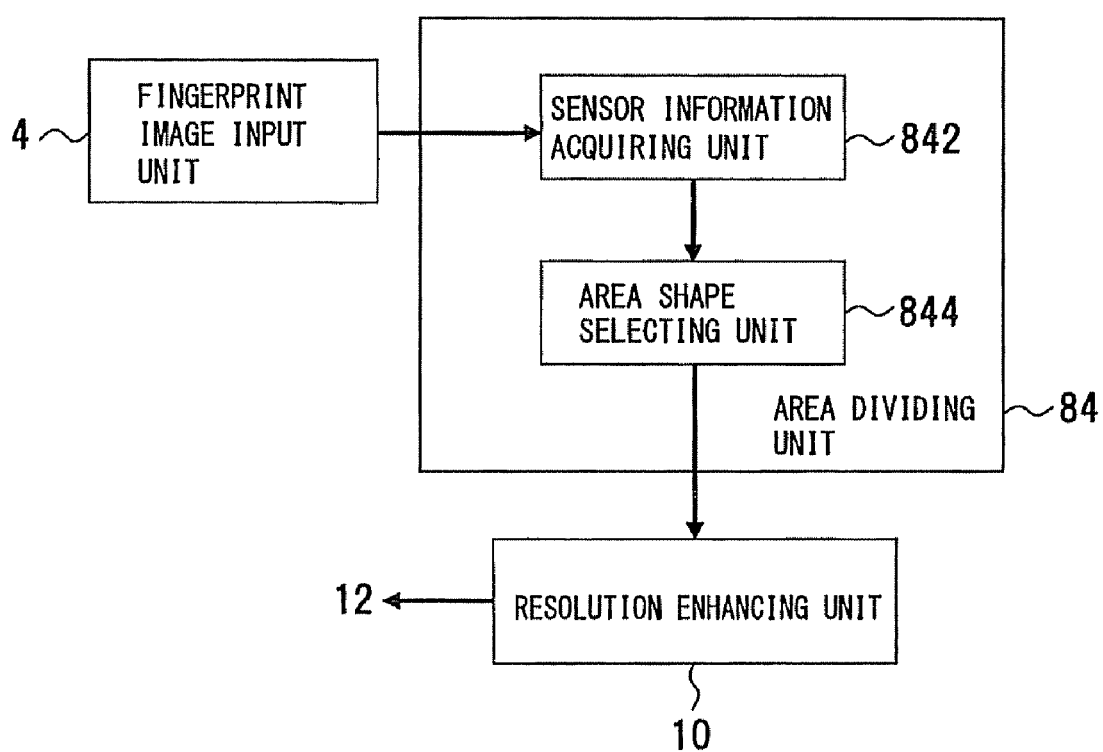
FIG. 24 is a diagram of a configuration example of an area dividing unit.
Figure 25:
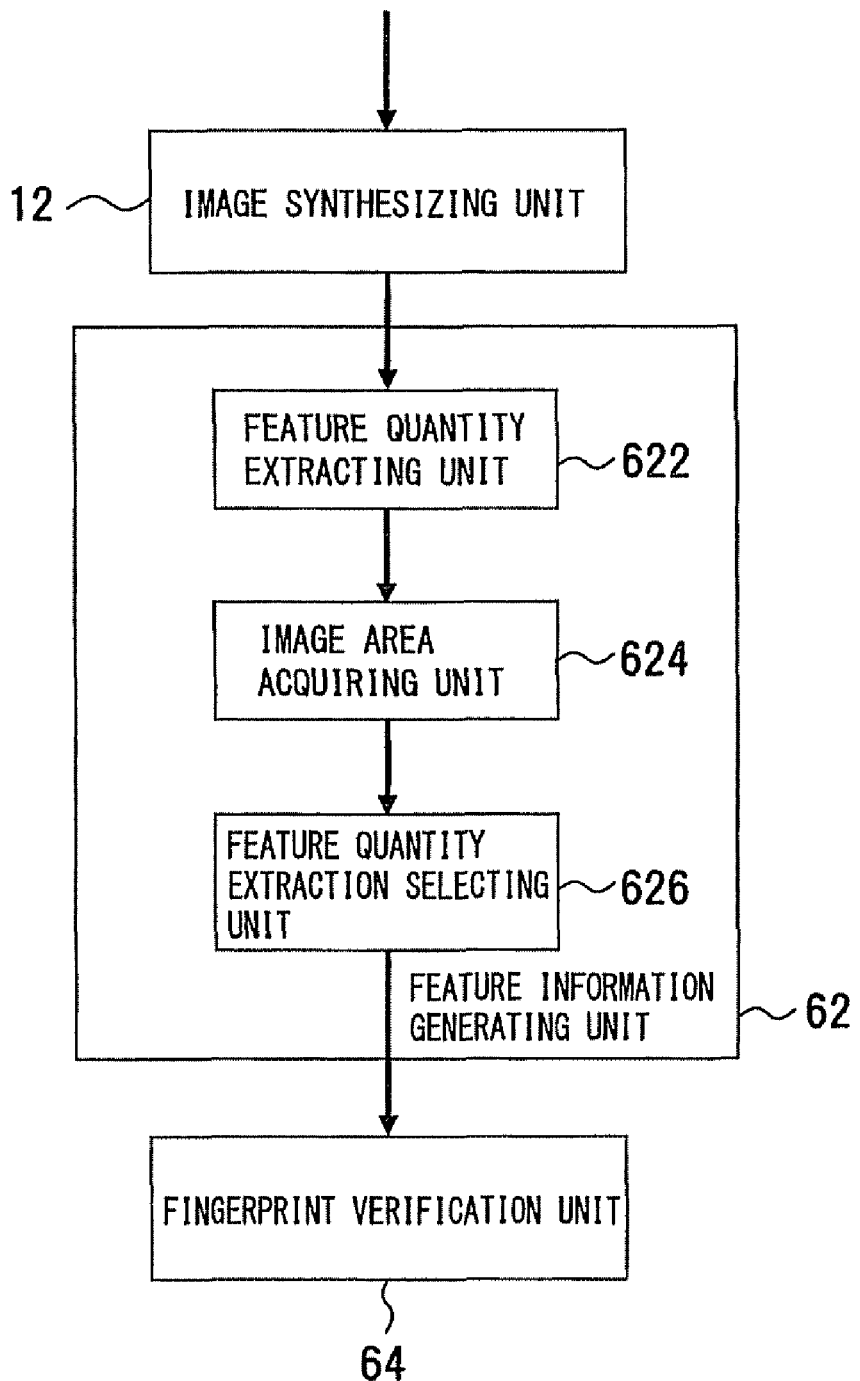
FIG. 25 is a diagram of a configuration example of the feature information generating unit.
Figure 26:
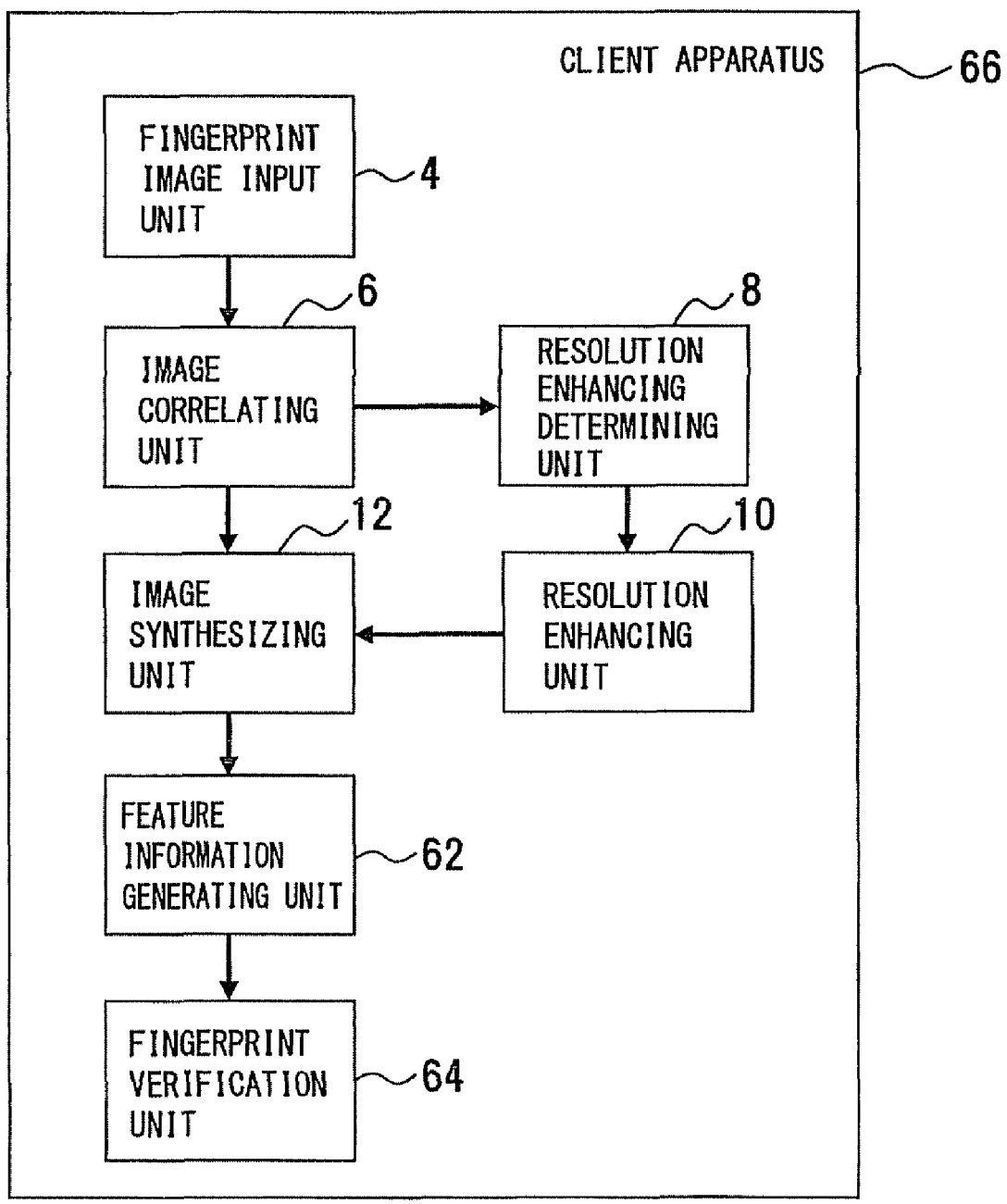
FIG. 26 is a diagram of a configuration example of local authentication by the fingerprint authenticating apparatus.
Figure 27:
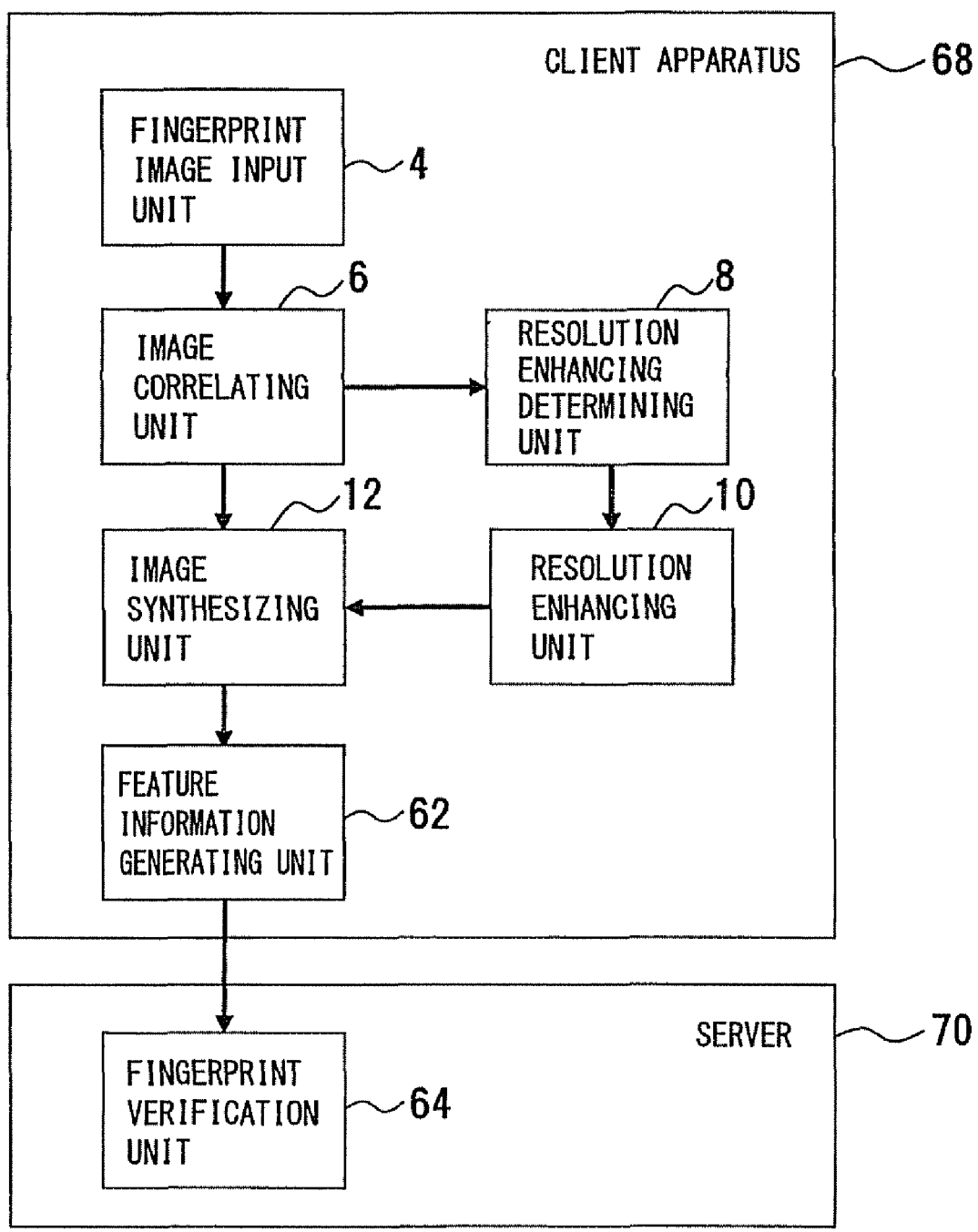
FIG. 27 is a diagram of a configuration example of server authentication by the fingerprint authenticating apparatus.

A third embodiment is described with reference to FIGS. 18, 19, 20, 21, 22, 23, 24, 25, 26, and 27. FIG. 18 is a block diagram of a fingerprint authenticating apparatus, FIG. 19 depicts a flowchart of a procedure of fingerprint authentication, FIG. 20 depicts a configuration example of a feature information generating unit and a fingerprint verification unit, FIG. 21 depicts a configuration example of feature information, FIG. 22 depicts a configuration example of the feature information generating unit and another fingerprint verification unit, FIG. 23 depicts a configuration example of feature information, FIG. 24 depicts a configuration example of the area dividing unit (FIG. 7), FIG. 25 depicts another configuration example of the feature information generating unit, FIG. 26 depicts a configuration example of a client apparatus, and FIG. 27 depicts a configuration example of the client apparatus and a server. Configurations of FIGS. 18 to 27 are presented as examples, and therefore the present invention is not limited by such configurations. In FIGS. 18, 22, and 24 to 27, the same components as the components of FIGS. 1 and 13 are denoted by the same reference numerals.

The fingerprint authenticating apparatus 60 is constructed by using either of the fingerprint image acquiring device 2A (FIG. 1) or the fingerprint image acquiring device 2B (FIG. 13). As depicted in FIG. 18, the fingerprint authenticating apparatus 60 includes the fingerprint image acquiring device 2A or 2B, the feature information generating unit 62, and the fingerprint verification unit 64.

The fingerprint image acquiring apparatus 2A or 2B includes the fingerprint image input unit 4, the image correlating unit 6, the resolution enhancing determining unit 8, the resolution enhancing unit 10, and the image synthesizing unit 12. These components are the same components of the first and second embodiment (FIGS. 1 and 13), and therefore are denoted by the same reference numerals and are omitted in further description.

The feature information generating unit 62 acquires a synthesized fingerprint image (synthesized image) from the image synthesizing unit 12. This synthesized image is enhanced only partially in resolution, so that a process of extracting a feature quantity classified in level 3 cannot be applied to the whole of the image. Applying this extracting process to the image ends up extracting a feature quantity that cannot offer sufficient authentication precision. A feature quantity to be extracted is, therefore, a feature quantity of level 1 and level 2 that can be acquired from a low-resolution fingerprinting image. A case of a feature point as feature quantity of level 2 is described herein. A feature point is extracted from a synthesized image, and feature information made up of the extracted feature point is generated.

The fingerprint verification unit 64 registers the generated feature information when set to a register mode by the initial setting. In an operation state following the completion of the initial setting, therefore, feature information generated by the feature information generating unit 62 is input, and is verified with the pre-registered registered feature information to determine whether a person is the authentic person. The fingerprint verification unit 64 has a comparing means that makes a comparison using a feature point or a function equivalent to the comparing means, thus making a comparison and a verification using feature points in both pieces of feature information. The fingerprint verification unit 64 then compares a similarity level resulting from the above comparison and verification with a given threshold to determine whether a person is the authentic person.

The procedure of fingerprint authentication by the fingerprint authenticating apparatus 60 is an example of a fingerprint authenticating method or a fingerprint authenticating program. As depicted in FIG. 19, the procedure is carried out by executing a fingerprint image input step by the fingerprint image input unit 4 (step S31), a correlating step by the image correlating unit 6 (step S32), a resolution enhancing determining step by the resolution enhancing determining unit 8 (step S33), a resolution enhancing step by the resolution enhancing unit 10 (step S34), and an image synthesizing step by the image synthesizing unit 12 (step S35). These steps are the same as the steps of the first and second embodiments. Following the image synthesizing step, a feature information generating step by the feature information generating unit 62 (step S36) and a fingerprint verification step by the fingerprint verification unit 64 (step S37) are executed.

Features, specific configuration examples, and other configuration examples that are extracted from this embodiment is hereinafter enumerated.

(1) The fingerprint authenticating apparatus 60 carries out position matching to synthesize a plurality of fingerprint images, determines whether resolution enhancing is possible on an overlapping area in images, synthesizes fingerprint images, and generates a fingerprint image enhanced in resolution in an area making resolution enhancing possible (FIGS. 1, 7, 8, and 9). The fingerprint authenticating apparatus 60 includes the fingerprint image input unit 4 that acquires a fingerprint image, the overlapping area detecting unit 82 (FIG. 7) that detects an overlapping area in fingerprint images, the resolution enhancing determining unit 8 that estimates the presence or absence of reproducibility between images in an overlapping area to determine that resolution enhancing is possible when sufficient reproducibility is present, and the resolution enhancing unit 10 that enhances the resolution of an area determined to be an area making resolution enhancing possible. The resolution enhancing determining unit 8 has the feature quantity extracting unit 86 and the feature quantity comparing unit 88 (FIG. 7), extracts feature quantities from fingerprinting images, compares the images with each other using the feature quantities to calculate a similarity level, thus estimates the presence or absence of reproducibility (similarity). A ridgeline pattern and a feature point that can be acquired by a low-resolution fingerprint sensor may be used as the feature quantities.

In this manner, the fingerprint authenticating apparatus 60 generates a high-resolution image in an area overlapping between consecutively input fingerprint images, and synthesizes partial images with the high-resolution image to generate a fingerprint image partially enhanced in resolution. The fingerprint verification method used in fingerprint authentication can be used for estimation of reproducibility.

(2) Either of the sweep fingerprint sensor 14 (FIG. 1) and the flat fingerprint sensor 42 (FIG. 13) may be used as the fingerprint image input unit 4. When the sweep fingerprint sensor 14 is used, division into block-shaped areas enables generation of high-resolution images in a greater number of divided areas. When the flat fingerprint sensor 42 is used, division using circular shapes or square shapes based on the positions of feature points as references enables generation of high-resolution images in areas near the feature points that are important for authentication capability. Fingerprint verification thus can be carried out using a fingerprint image partially enhanced in resolution.

(3) The fingerprint authenticating apparatus 60 divides an overlapping area into small areas and determines whether resolution enhancing is possible for each divided area to reduce an effect on resolution enhancing that is caused by extension/contraction characteristic of a fingerprint image. This enables local enhancing of a resolution. For example, a fingerprint image is divided into block-shaped areas as depicted in FIG. 5, or an area is divided using given shapes based on the positions of feature points as references as depicted in FIG. 16. In the case of FIG. 5, a determination is made for each block to enhance the resolution of a block making resolution enhancing possible. In the case of FIG. 16, a determination is made on the interior of the given shape. A method of dividing a fingerprint image is selected as a method fit to the type of a fingerprint sensor, which is the fingerprint image input means, or to a verification method. Referring to FIG. 6 depicting an image partially enhanced in resolution reveals that the high-resolution area 40 is converted in resolution to have a resolution two times the original resolution. Actually, the area not enhanced in resolution is subjected to such image processing as expansion or linear interpolation to have the same resolution as that of the high-resolution area, thus integrated into a single image.

(4) The fingerprint authenticating apparatus 60 extracts a feature quantity from a fingerprint image generated by the image synthesizing unit 12, generates feature information used for verification, and determines whether a person is the authentic person by verifying the generated feature information with pre-registered feature information (FIGS. 18 and 19). In this case, the feature information generating unit 62 has plural kinds of feature quantity extracting units 6201, 6202, 6203 . . . as feature quantity extracting means, as depicted in FIG. 20, and generates feature information 130 (FIG. 21) composed of plural kinds of feature quantities. As depicted in FIG. 21, this feature information 130 includes a ridgeline pattern (feature quantity of level 1) 132, a feature point (feature quantity of level 2) 134, a feature point (feature quantity 1 of level 3) 1361, a feature point (feature quantity 2 of level 3) 1362 . . . . The fingerprint verification unit 64 has a plurality of feature quantity comparing units 6421, 6422, 6423 . . . as feature quantity comparing means (units) corresponding to the feature quantity extracting units 6201, 6202, 6203 . . . , and a verification determining unit 644. The feature quantity comparing units 6421, 6422, 6423 . . . carry out comparison for each type of a feature quantity, and the verification determining unit 644 carries out verification determination based on a comparison result from each of the feature quantity comparing units 6421, 6422, 6423 . . . to determine whether a person is the authentic person. Such a configuration enables execution of highly precise image authentication.

(5) The fingerprint authenticating apparatus 60 acquires the area of a high-resolution image that is generated as a result of processing consecutively input partial images, and when the acquired area is sufficiently large, extracts a feature quantity of level 3 to generate feature information to be used for verification. Specifically, the image synthesizing unit 12 receives the generated high-resolution image to synthesize partial images with the high-resolution image, and updates the area of the high-resolution image in a synthesized image. The feature information generating unit 62 receives the synthesized image and the area, and when the area is found to be larger than a given threshold in comparison, extracts a feature quantity classified in level 3 to generate feature information. The fingerprint verification unit 64 confirms the types of feature quantities making up the feature information, selects a feature quantity comparing unit to be used from the feature quantity comparing units 6421, 6422, 6423 . . . , and carries out a comparison and a verification for each feature quantity.

The verification determining unit 644 determines whether a person is the authentic based on the result of the comparison and the verification.

(6) In the fingerprint authenticating apparatus 60, for selection of a feature quantity comparing unit to be used from the feature quantity comparing units 6421, 6422, 6423 a comparison selecting unit 646 (FIG. 22) may be disposed as a comparison selecting means (unit) at the front stage of the feature quantity comparing units 6421, 6422, 6423 . . . . As depicted in FIG. 22, the fingerprint authenticating apparatus 60 having such a configuration includes the feature quantity extracting units 6201, 6202, 6203 . . . , the feature quantity comparing units 6421, 6422, 6423 . . . corresponding thereto, and the comparison selecting unit 646 that selects any one of the feature quantity comparing units 6421, 6422, 6423 . . . to carry out verification in switchover of the comparing means in accordance with the type of a feature quantity. In such a configuration, a determination is made referring to fingerprint verification results from the plurality of feature quantity comparing means. This can improve authentication capability and authentication precision.

(7) The fingerprint authenticating apparatus 60 correlates a feature quantity of level 3 extracted from a high-resolution image generated from an image near a feature point with the feature point to generate feature information, and carries out fingerprint verification using the feature point and the feature quantity of level 3. Specifically, the resolution enhancing determining unit 8 extracts a feature point from an overlapping area, and estimates reproducibility in an area near the feature point. When resolution enhancing is determined to be possible, the resolution enhancing unit 10 generates a high-resolution image. The image synthesizing unit 12 synthesizes input partial images, updates the position of the feature point used for generating the high-resolution image to a position in a synthesized image, and correlates the feature point with the high-resolution image to store the correlated feature point and high-resolution image in, for example, a data memory unit 906 (FIG. 34) serving as a data recording means. The position of an already stored feature point is also updated to a position in the high-resolution image in succession. The feature information generating unit 62 receives the high-resolution image correlated with the feature point to acquire positional information on a sweat gland pore and the shape of outline of a ridgeline from the high-resolution image, and generates feature information 140 (FIG. 23) composed of the feature point and the feature quantity of level 3. This feature information 140 includes feature points 141, 142, and 143 . . . , in which case the feature point 141 represents a feature quantity 1 of level 3 as a feature point 1, the feature point 142 represents a feature quantity 2 of level 3 as a feature point 2, and the feature point 143 represents a feature quantity 3 of level 3 as a feature point 3. The fingerprint verification unit 64 first carries out verification using feature points included in feature information, and then carries out verification using feature quantities of level 3 for a set of feature points considered to be matching to each other. In this manner, a high-resolution image near a feature point is generated and a feature quantity classified in level 3 is extracted. This can realize the fingerprint verification method using both feature point and feature quantity of level 3.

(8) For dividing an area in a fingerprint image, the area dividing unit 84 (FIG. 7) in the resolution enhancing determining unit 8 has a sensor information acquiring unit 842 and an area shape selecting unit 844, as depicted in FIG. 24. This can provide a configuration for selecting an area shape in accordance with the type and output of a fingerprint sensor used as the fingerprint image input unit 4. The sensor information acquiring unit 842 is a means that acquires sensor information, such as information of the type of a fingerprint sensor used as the fingerprint image input unit 4 that is acquired from output from the fingerprint sensor (i.e., output from the fingerprint image input unit 4) and identification information indicative of the fingerprint sensor to be provided. The area shape selecting unit 844 is an area shape selecting means (unit) that receives the sensor information to select an area shape for dividing a fingerprint image in accordance with the sensor information. According to this configuration, the fingerprint image can be divided into area shapes in accordance with the type and output of a fingerprint sensor used as the fingerprint image input unit 4, which can improve resolution enhancing on a fingerprint image and the precision of fingerprint authentication.

(9) The feature information generating unit 62 (FIG. 18) may have a feature quantity extracting unit 622, an image area acquiring unit 624, and a feature quantity extraction selecting unit 626 as depicted in FIG. 25, to have a configuration for selecting a feature quantity based on the area of an acquired high-resolution image. In this configuration, the feature quantity extracting unit 622 is a feature quantity extracting means that extracts a plurality of types of feature quantities from a fingerprint image input from the fingerprint image input unit 4. The feature quantity extracting unit 622, for example, may have a configuration equivalent to the configuration of FIG. 20. The image area acquiring unit 624 is an image area acquiring means (unit) that acquires the area of a high-resolution image from a fingerprint image enhanced in resolution by the resolution enhancing unit 10 (FIG. 18). The feature quantity extraction selecting unit 626 is a feature quantity extraction selecting means (unit) that selects a feature quantity based on an acquired area. In this configuration, for example, a feature quantity classified in level 3 can be extracted and subjected to a determination depending on the size of an area enhanced in resolution (area size). This can improve the stability of fingerprint verification and fingerprint authentication using a feature quantity of level 3 and authentication precision.

(10) The fingerprint authenticating apparatus 60 allows the use of information of the outline of a ridgeline extracted from a fingerprint image as a feature quantity, and may allow the use of the position of a sweat gland pore on a ridgeline as a feature quantity.

(11) The fingerprint authenticating apparatus 60 may be configured as a client apparatus 66 that carries out local authentication including processes ranging from fingerprint image input to fingerprint verification, as depicted in FIG. 26, or may be configured as a combination of a client apparatus 68 and a server 70, as depicted in FIG. 27. In the case of FIG. 27, the client apparatus 68 carries out processes ranging from fingerprint image input to feature information generation as the server 70 verifies feature information kept registered in the server 70 with feature information transmitted from the client apparatus 68 in carrying out server authentication operation. In FIGS. 26 and 27, the same components as the components of FIG. 18 are denoted by the same reference numerals and are omitted in description.

Fourth Embodiment

Figure 28:
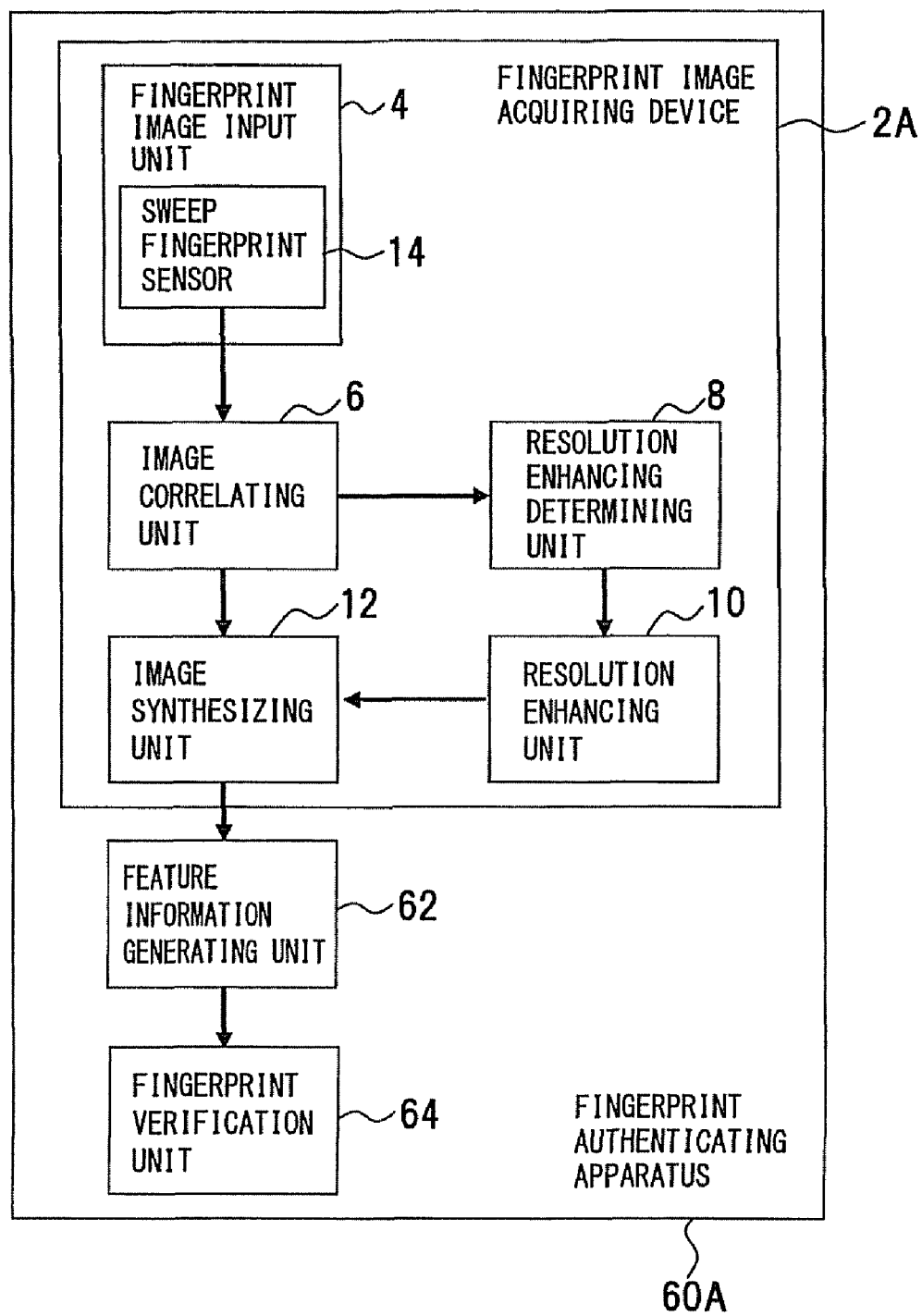
FIG. 28 is a diagram of a fingerprint authenticating apparatus of a fourth embodiment.
Figure 29:
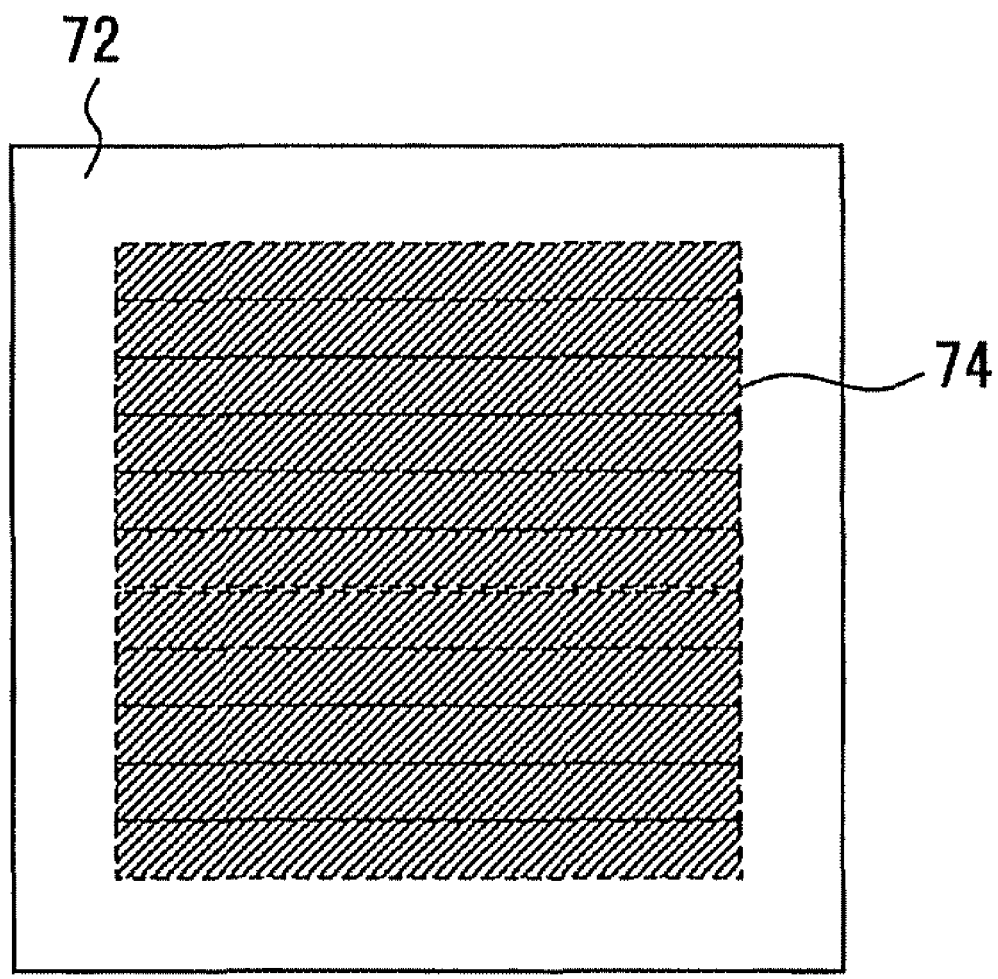
FIG. 29 is a diagram of an example of a synthesized image.
Figure 30:
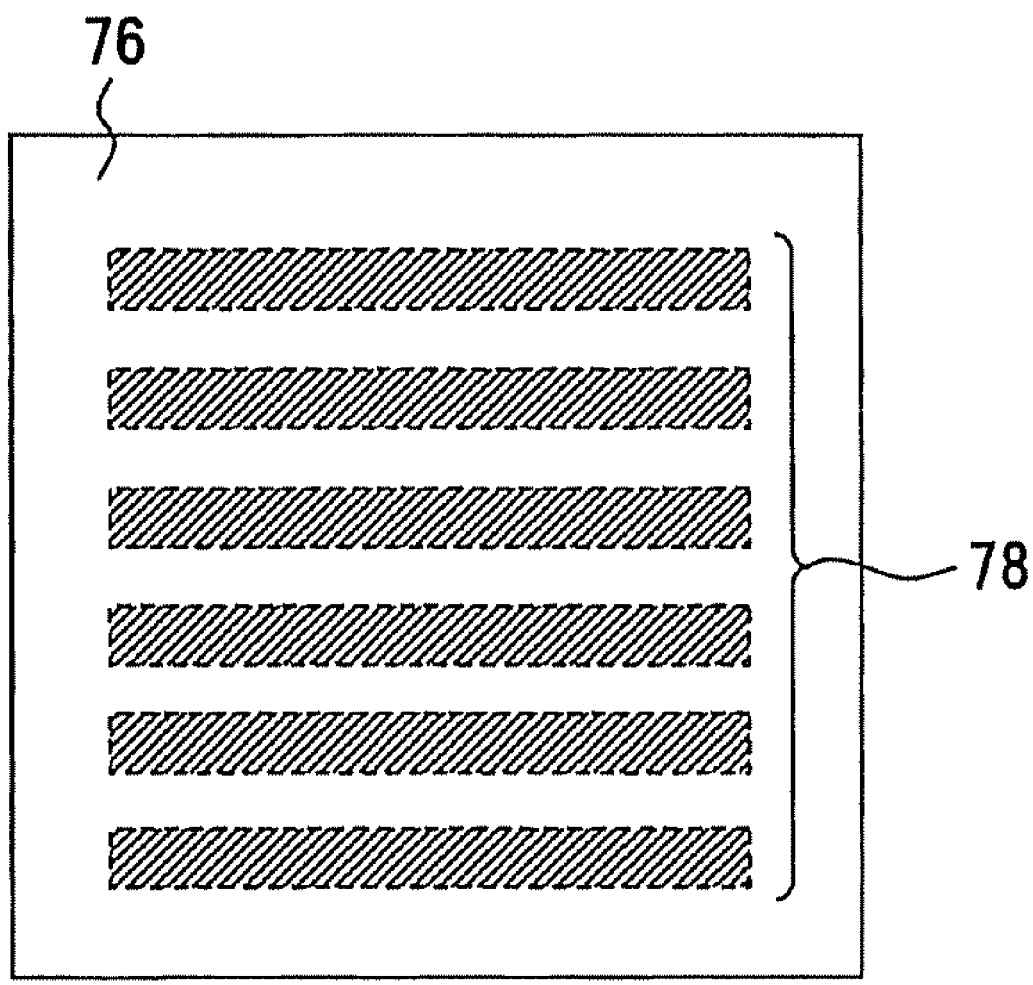
FIG. 30 is a diagram of an example of a synthesized image.

A fourth embodiment is described with reference to FIGS. 28, 29, and 30. FIG. 28 depicts a fingerprint authenticating apparatus in which a sweep fingerprint sensor is used as the fingerprint image inputting means, FIG. 29 depicts an example of a generated synthesized image, and FIG. 30 depicts an example of a generated synthesized image. Configurations of FIGS. 28, 29 and 30 are presented as examples, and therefore the present invention is not limited by such configurations. In FIG. 28, the same components as components of FIGS. 1 and 18 are denoted by the same reference numerals.

In the fingerprint authenticating apparatus 60A (FIG. 28) of this embodiment, the fingerprint image input unit 4 provided as the sweep fingerprint sensor 14, the image correlating unit 6, the resolution enhancing determining unit 8, and the resolution enhancing unit 10 are the same components as described in the first embodiment (FIG. 1), and therefore are denoted by the same reference numerals and is omitted in further description.

In this forth embodiment, the image synthesizing unit 12 receives a high-resolution image generated by the resolution enhancing unit 10 to synthesize partial images with the high-resolution image, and acquires the range of the high-resolution image in a synthesized image. In the case of using the sweep fingerprint sensor 14, an overlapping area is often formed as a square because of vertical operation of a finger, so that a high-resolution image is formed also as a square in many cases. The range of the high-resolution image in a synthesized image is determined by acquiring the upper left coordinate, vertical width, and lateral width of the high-resolution image in the synthesized image. When the high-resolution image is not an image of such a simple shape as square, an area (number of pixels) occupied by the high-resolution image may be acquired. Every time partial images are synthesized, the same process is repeated in succession to acquire the area occupied by the high-resolution image in the synthesized image.

The feature information generating unit 62 acquires the synthesized image and the area occupied by the high-resolution image to compare the value of the area with a given threshold. When the value of the area is larger than the given threshold, the feature quantity extracting means for extracting a feature quantity classified in level 3 (feature quantity extracting units 6201, 6202, 6203 . . . of FIG. 22) is used to acquire a feature quantity. When the value of the area is smaller than the given threshold, only the feature quantity classified in level 1 or level 2 is acquired.

In this case, no problem is involved in verifying when high-resolution images 74 are generated in a continuous form on a synthesized image 72, as depicted in FIG. 29. When high-resolution images 78 are generated as separated pieces of images on a synthesized image 76, as depicted in FIG. 30, however, verification cannot be carried out if feature quantities of level 3 are acquired in areas different in feature information used for authentication. The area occupied by the high-resolution image may be determined not using the total area, but may be determined by acquiring the area of each separated piece of high-resolution image to use the each area.

The fingerprint verification unit 64 confirms the types of feature quantities making up registered feature information and of feature quantities making up feature information generated at the time of authentication. When both pieces of information have feature quantities of level 3, the fingerprint verification unit 64 carries out comparison and verification through the feature quantity comparing means using a feature quantity of level 3 (feature quantity comparing units 6421, 6422, 6423 . . . of FIG. 22). An example of the fingerprint verification method using a feature quantity of level 3 is described in Nonpatent Literature 2. When both pieces of information do not have feature quantities of level 3, the fingerprint verification unit 64 carries out comparison and verification through the feature quantity comparing means using a feature quantity of level 1 or level 2 (feature quantity comparing units 6421, 6422, 6423 . . . of FIG. 22). Whether a person is the authentic person is thus determined by the result of determination on whether a similarity level resulting from the above comparison and verification exceeds a given threshold. While only one of a feature quantity of level 3 and a feature quantity of level 1 or level 2 is used in this embodiment, both feature quantities may be used simultaneously.

The fingerprint authenticating apparatus 60A using the sweep fingerprint sensor 14 as the fingerprint image inputting means may operate in the form of local authentication (FIG. 26) and of server authentication (FIG. 27) in the same manner as in the third embodiment.

Fifth Embodiment

Figure 31:
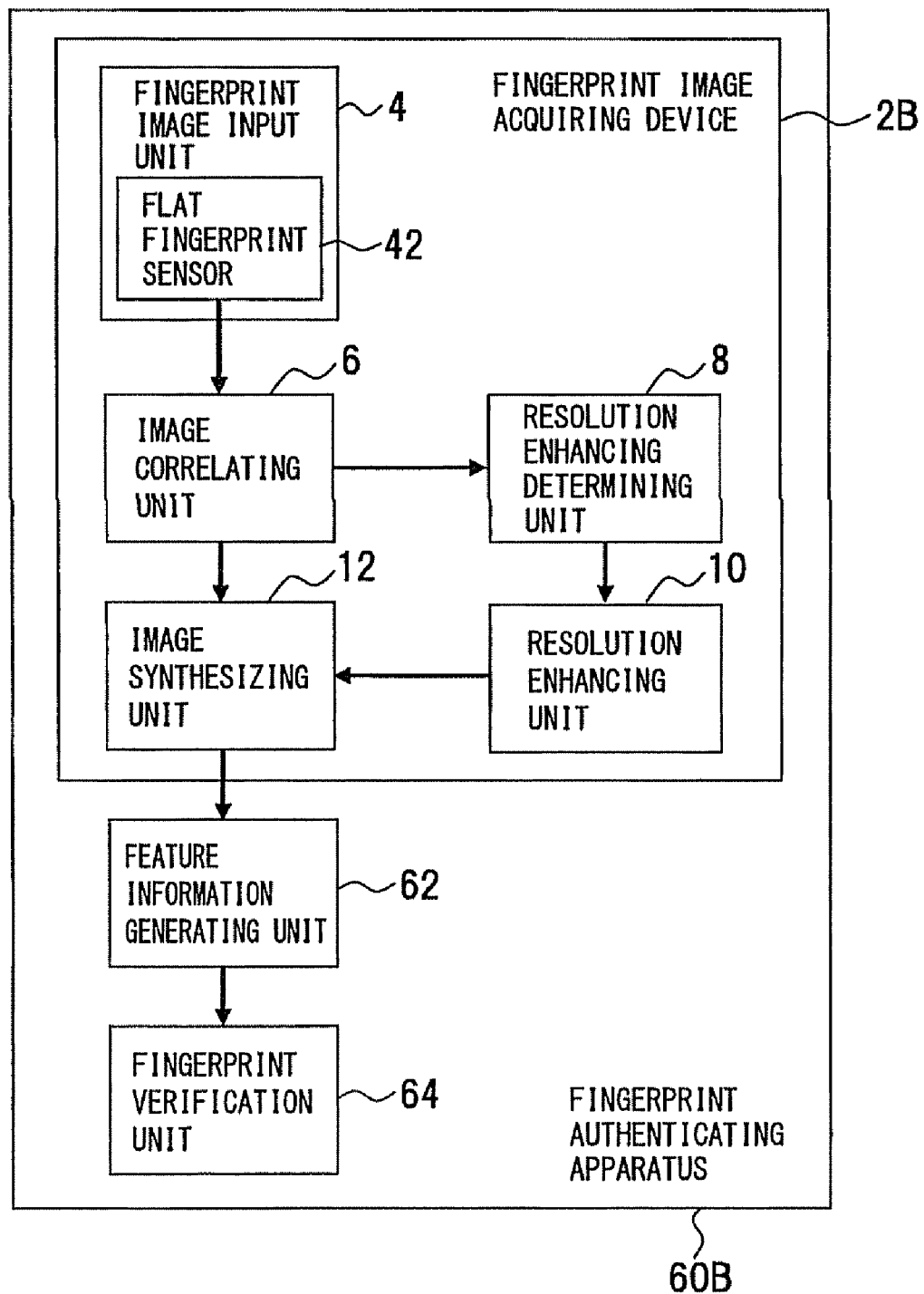
FIG. 31 is a fingerprint authenticating apparatus of a fifth embodiment.
Figure 32:
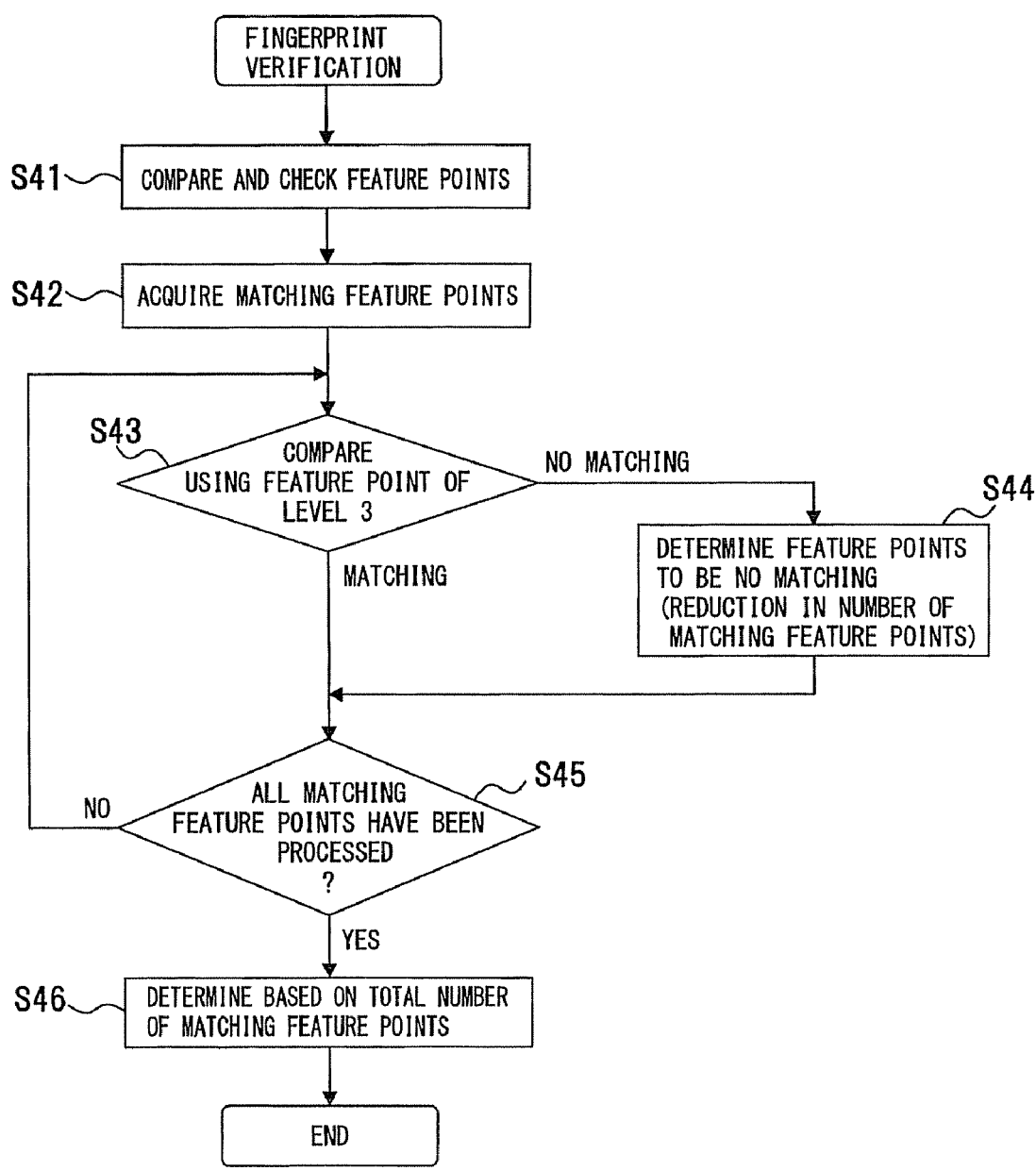
FIG. 32 is a flowchart of a procedure of fingerprint authentication.

A fifth embodiment is described with reference to FIGS. 31 and 32. FIG. 31 depicts a fingerprint authenticating apparatus using a flat fingerprint sensor as the fingerprint image inputting means, and FIG. 32 is a flowchart of a procedure of fingerprint verification. Configurations of FIGS. 31 and 32 are presented as examples, and therefore the present invention is not limited by such configurations. In FIG. 31, the same components as the components of FIGS. 13 and 18 are denoted by the same reference numerals.

In the fingerprint authenticating apparatus 60B (FIG. 31) of this embodiment, the fingerprint image input unit 4 provided as a sweep fingerprint sensor 42, the image correlating unit 6, the resolution enhancing determining unit 8, and the resolution enhancing unit 10 are the same components as described in the second embodiment (FIG. 13), and therefore is omitted in further description.

In this embodiment, the image synthesizing unit 12 synthesizes input partial images with a high-resolution image, updates the position of a feature point used for generating the high-resolution image to a position in a synthesized image, and correlates the feature point with the high-resolution image to store them. The position of an already stored feature point is also updated to a position in the high-resolution image in succession. If feature points correlated with high-resolution images generated in different times of synthesis are the same, a high-resolution image generated later and the feature point are stored in priority. Whether feature points are the same is determined by comparing the positions of the feature points in a synthesized image. If the distance between two feature points is within a given threshold, the feature points are determined to be the same. In addition to the position of a feature point, the type of the feature point may also be used for the determination.

The feature information generating unit 62 receives a high-resolution image correlated with a feature point, acquires position information on a sweat gland pore and the shape of outline of a ridgeline from the high-resolution image, and generates feature information composed of the feature point and the feature quantity of level 3.

The fingerprint verification unit 64 is the means that carries out verification using feature points included in feature information, carrying out further comparison and verification between a set of feature points considered to be matching to each other, using feature quantities of level 3 correlated with the feature points. When the result of the comparison and verification is no matching, the set of feature points are determined to be no matching. Whether a person is the authentic person is determined based on the total number of matching feature points.

This procedure of fingerprint verification is an example of a processing method for verifying and a processing program for verifying. As depicted in FIG. 32, feature points are compared and verified (step S41) to acquire matching feature points (step S42), which are then compared using a feature point of level 3 (step S43). When the result of comparison at step S43 is no matching, the feature points are determined to be no matching (reduction in the number of matching feature points) (step S44). When the result of comparison at step S43 is matching, whether all matching feature points have been processed is determined (step S45). When all matching feature points have not been processed yet (NO at step S45), the procedure returns to step S43. When all matching feature points have been processed (YES at step S45), a determination is made based on the total number of matching feature points (step S46), after which the fingerprint verification procedure is ended.

The fingerprint authenticating apparatus 60B using the flat fingerprint sensor 42 as the fingerprint image inputting unit 4 may also operate in the form of local authentication (FIG. 26) and of server authentication (FIG. 27) in the same manner as in the third embodiment.

Sixth Embodiment

Figure 33:
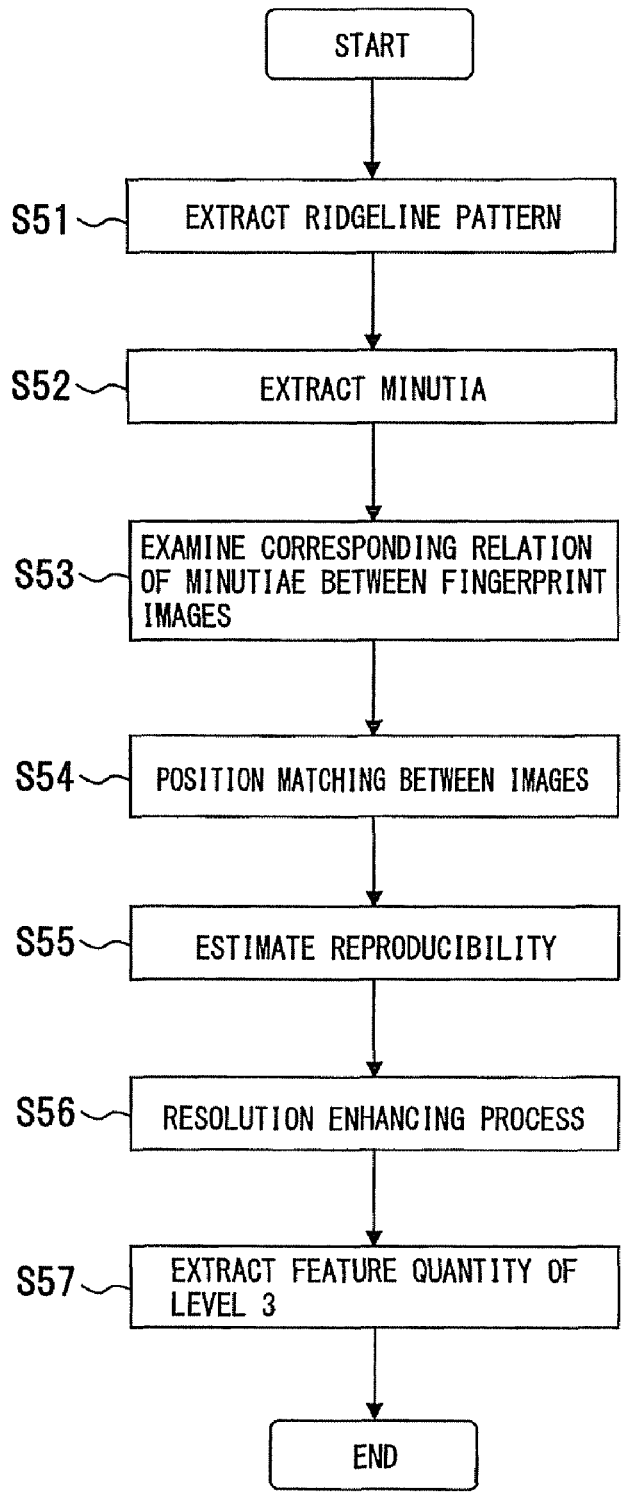
FIG. 33 is a flowchart of a feature quantity extraction process of a sixth embodiment.

A sixth embodiment is described with reference to FIG. 33. FIG. 33 is a flowchart of a procedure of feature quantity extraction according to a sixth embodiment. A configuration of FIG. 33 is presented as an example, and therefore the present invention is not limited by such a configuration.

In the sixth embodiment, a common minutia is selected from minutiae extracted from fingerprint images. A ridgeline pattern and a minutia that can be acquired by a low-resolution sensor may be used as feature information. In this embodiment, when feature quantities are extracted using a plurality of fingerprint images, reproducibility is estimated for each area in an image using a feature quantity that can be extracted by a low-resolution finger print sensor, and resolution enhancing is carried out in an area of high reproducibility to extract a feature quantity of level 3, as in the above embodiments. Specifically, attention is paid only to the area near a minutia to reduce the effect of extension/construction characteristic of a fingerprint, so that this embodiment includes a process of determining whether resolution enhancing is possible based on the reproducibility of a ridgeline pattern in that area. The configurations of the first to fifth embodiments are used in this procedure.

This procedure is an example of a processing method or a processing program for feature quantity extraction. As depicted in FIG. 33, a ridgeline pattern is extracted from each fingerprint image (step S51), and a minutia is extracted from each fingerprint image (step S52). The corresponding relation of minutiae between fingerprint images is examined (step S53), and position matching between the images is carried out using minutiae acquired in common (step S54). Ridgeline patterns near the common minutiae are compared to estimate reproducibility (step S55).

The resolution enhancing process is then carried out only in the area of high reproducibility (high matching level) (step S56). In this resolution enhancing process, pixels corresponding to each other between images are compared, and an intermediate pixel is determined by interpolation to enhance a resolution. A feature quantity of level 3 is then extracted from an area enhanced in resolution (step S57), after which the procedure is ended.

According to the above configuration, whether resolution enhancing is possible is determined for each area in an image using a feature quantity that can be extracted by a low-resolution fingerprint sensor, and a feature quantity of level 3 is extracted from an area enhanced in resolution. This enables distinguishing the authentic person from another person even when only the partial area of a fingerprint can be used for authentication by a low-resolution sensor, thus allows execution of highly precise fingerprint authentication.

Seventh Embodiment

Figure 34:
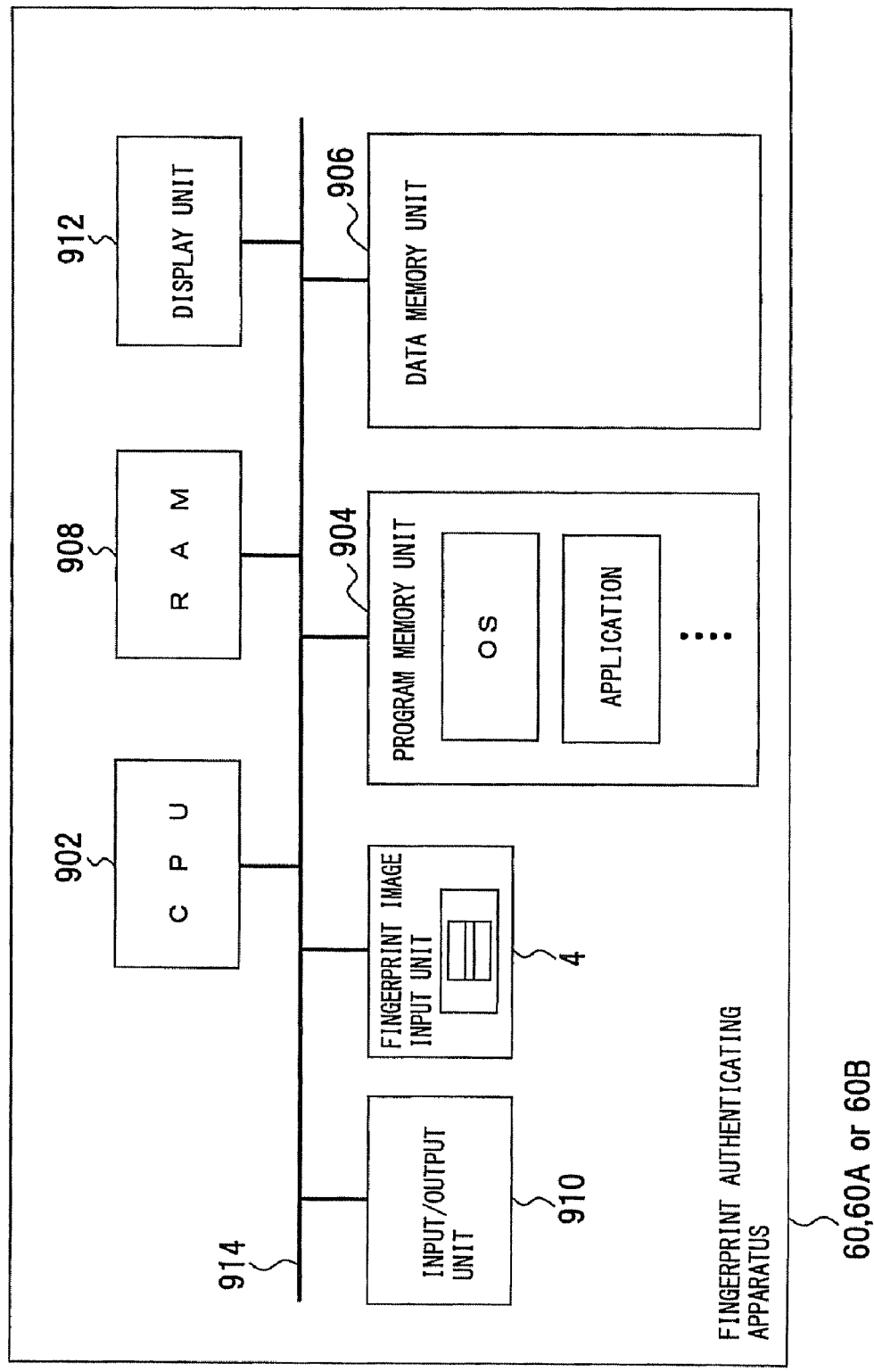
FIG. 34 is a diagram of an example of hardware of a fingerprint image acquiring device or a fingerprint authenticating apparatus using the fingerprint image acquiring device according to a seventh embodiment.
Figure 35:
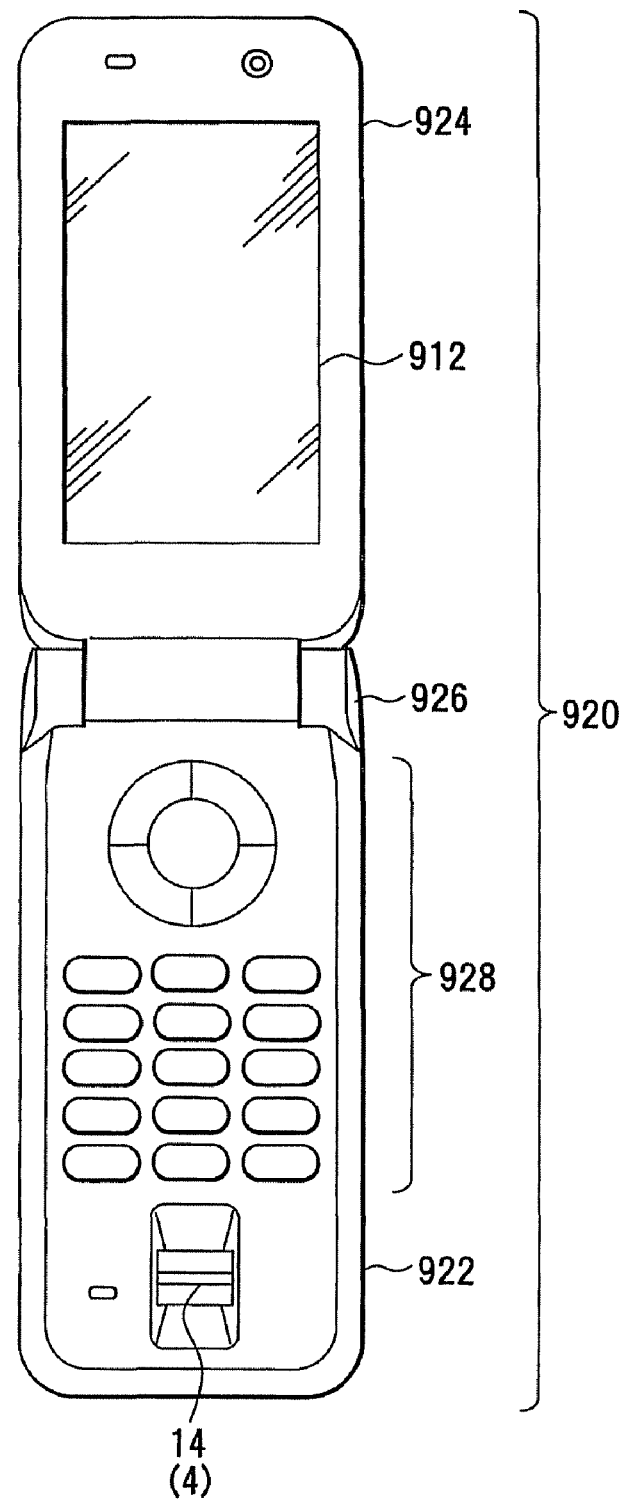
FIG. 35 is a diagram of a portable apparatus.

A seventh embodiment is described with reference to FIGS. 34 and 35. FIG. 34 depicts a hardware configuration of the fingerprint authenticating apparatus, and FIG. 35 depicts a portable apparatus equipped with the fingerprint authenticating apparatus. Configurations of FIGS. 34 and 35 are presented as examples, and therefore the present invention is not limited by such configurations. In FIGS. 34 and 35, the same components as components of FIGS. 1 and 18 are denoted by the same reference numerals.

The fingerprint authenticating apparatus 60 (FIG. 18), 60A (FIG. 28), or 60B (FIG. 31) has a computer serving as an information processing means that acquires an image and that authenticates a fingerprint, as depicted in FIG. 34. The fingerprint authenticating apparatus 60, 60A or 60B includes a CPU (Central Processing Unit) 902, a program memory unit 904, a data memory unit 906, a RAM (Random Access Memory) 908, an input/output unit 910, a display unit 912, and the fingerprint image input unit 4, which are interconnected through a bus 914.

The CPU 902 is a control means that executes an application program, such as an OS (Operating System) and authentication program, to carry out processes of fingerprint image acquiring, resolution enhancing, and verifying, and other processes of storing and calculating various data. The CPU 902 and the RAM 908 jointly make up the image correlating unit 6, the resolution enhancing determining unit 8, the resolution enhancing unit 10, the image synthesizing unit 12, the feature information generating unit 62, the fingerprint verification unit 64, etc.

The RAM 908 is a work area. The display unit 912 is an information display means, and is composed of, for example, an LCD (Liquid Crystal Display). The input/output unit 910 is used for information input/output, etc., and a keyboard, etc., is used for inputting information.

The fingerprint image input unit 4 is provided as a low-resolution fingerprint sensor that is the sweep fingerprint sensor 14 or the flat fingerprint sensor 42, serving as a fingerprint image taking means.

The program memory unit 904 is an example of a memory means that records a program thereon, and is composed of a recording medium allowing data reading/writing thereon by a computer. The program memory unit 904 stores therein such routines as OS and application programs including the above image acquiring program, resolution enhancing processing program, and image verification program.

The data memory unit 906 is an example of a storage means that stores data therein, which data includes a fingerprint image, high-resolution image, and a synthesized image. Storage of other necessary data may be set in accordance with each of the above embodiments.

The fingerprint authenticating apparatus 60, 60A, or 60B is, for example, incorporated in the portable apparatus 920 (FIG. 35), which includes a case unit 922, a case unit 944, and a hinge unit 926 via which the case units 922 and 944 can be opened and closed as depicted in FIG. 35. The case unit 922 has a keyboard 928 (an example of the input unit of the input/output unit 910) and the sweep fingerprint sensor 14. The case unit 924 has the display unit 912.

According to such a configuration, the portable apparatus 920 carries out resolution enhancing on a fingerprint image taken in from the low-resolution sweep fingerprint sensor 14, as described above, to enable highly reliable fingerprint authentication.

Features of Each Embodiment, and Other Embodiments (1) While the sweep fingerprint sensor 14 is used as the fingerprint image input unit 4 in the portable apparatus 920 (FIG. 35) in the above embodiment, the flat fingerprint sensor 42 (FIG. 14) may also be used.

(2) In the above embodiment, the portable apparatus 920 (FIG. 35) is described as an example of an apparatus that incorporates therein the fingerprint authenticating apparatus equipped with the fingerprint image acquiring device. The fingerprint authenticating apparatus, however, may be incorporated in small-sized information equipment, such as information terminal equipment connected to a personal computer (PC) and portable information terminal (PDA: Personal Digital Assistant), or in other electronic equipment.

Technical ideas extracted from the embodiments of the present invention described above is then enumerated. The technical ideas according to the present invention can be understood at different levels and as various variations covering superior concepts to subordinate concepts of the ideas. The following description, therefore, does not limit the present invention.

In the above fingerprint image acquiring device, preferably, the resolution enhancing determining unit may include: a feature quantity extracting unit to extract a feature quantity from a fingerprint image; and a feature quantity comparing unit to compare extracted feature quantities between fingerprint images, and wherein reproducibility is estimated based on a feature quantity extracted from a fingerprint image to determine whether resolution enhancing is possible.

In the above fingerprint image acquiring device, preferably, the feature quantity may include any one of a ridgeline shape (ridgeline pattern) and an end point and a branch point of a ridgeline (feature point).

In the above fingerprint image acquiring device, preferably, the resolution enhancing determining unit may further include an area dividing unit to divide an overlapping area into small areas, and wherein reproducibility between fingerprint images is estimated for each small area to determine whether resolution enhancing is possible, and an area making resolution enhancing possible is enhanced in resolution.

In the above fingerprint image acquiring device, preferably, the area dividing unit may include a sensor information acquiring unit to acquire sensor information indicative of a fingerprint sensor used as the fingerprint image input unit; and an area shape selecting unit to receive the sensor information from the sensor information acquiring unit to select an area shape for dividing the fingerprint image in accordance with the sensor information, and wherein the fingerprint image is divided into area shapes according to the fingerprint sensor.

According to the above configuration, division can be carried out using area shapes fit to the type of a fingerprint sensor.

In the above fingerprint image acquiring device, preferably, the overlapping area may be divided into block shapes when a sweep fingerprint sensor is used as the fingerprint image input unit.

According to the above configuration, division into block shapes is carried out when a sweep fingerprint sensor is used as the fingerprint image input unit. This enables generation of high-resolution images in a greater number of areas.

In the above fingerprint image acquiring device, preferably, division may be carried out using a given shape based on a position of a feature point as a reference when a flat fingerprint sensor is used as the fingerprint image input unit.

According to the above configuration, division is carried out using a circle or square based on the position of a feature point as a reference when a flat fingerprint sensor is used. This enables generation of a high-resolution image in an area near a feature point that is important for authentication capability.

The above fingerprint authenticating apparatus having the fingerprint image acquiring device, may preferably include: a feature information generating unit to generate feature information from a fingerprint image generated by the image synthesizing unit; and a fingerprint verification unit to verify acquired feature information with pre-registered feature information.

In the above fingerprint authenticating apparatus, preferably, the feature information generating unit may include: a feature quantity extracting unit to extract a plurality of types of feature quantities; an image area acquiring unit to acquire an area of a high-resolution image from the fingerprint image enhanced in resolution by the resolution enhancing unit; and a feature quantity extraction selecting unit to select a feature quantity based on the area that is acquired.

According to the above configuration, whether or not to extract a feature quantity classified in level 3 is determined based on the size of an area enhanced in resolution. This can improve the stability of fingerprint verification using a feature quantity of level 3.

In the above fingerprint authenticating apparatus, preferably, information of an outline of a ridgeline may be extracted as a feature quantity.

According to the above configuration, information of the outline of a ridgeline can be used as a feature quantity.

In the above fingerprint authenticating apparatus, preferably, a position of a sweat gland pore on a ridgeline mat be extracted as a feature quantity.

According to the above configuration, the position of a sweat gland pore on a ridgeline can be used as a feature quantity.

In the above fingerprint authenticating apparatus, preferably, the fingerprint verification unit may include: a plurality of feature quantity comparing units to compare a plurality of types of feature quantities extracted from the fingerprint image; a comparison selecting unit to select one of the feature quantity comparing units in accordance with a type of the feature quantity; and a verification determining unit to verify the feature information with each other based on a comparison result given by the feature quantity comparing unit selected by the comparison selecting unit.

According to the above configuration, whether a person is the authentic person is determined from the result of fingerprint verification carried out by a plurality of fingerprint verification methods. This can improve authentication capability.

The above fingerprint authenticating apparatus may preferably include: a resolution enhancing unit to generate a high-resolution image in an area of a given shape based on a feature point as a reference; an image synthesizing unit to update information of a position of a feature point to information of the position of the feature point in a synthesized image every time partial images are synthesized, the image synthesizing unit correlating the feature point with a high-resolution image to store the correlated feature point and high-resolution image; a feature information generating unit to extract either or both of information of an outline of a ridgeline and a position of a sweat gland pore from a high-resolution image, the feature information generating unit correlating the extracted information or position with a feature point to generate feature information; and a fingerprint verification unit to verify feature points included in each piece of feature information with each other, the fingerprint verification unit further verifying feature points determined to be matching with each other in terms of either or both of information of an outline of a ridgeline and a position of a sweat gland pore and determining whether the feature points are matching to output a determination result corresponding to the number of matching feature points.

According to the above configuration, a high-resolution image near a feature point is generated and a feature quantity classified in level 3 is extracted. This can realize the fingerprint verification method using both feature point and feature quantity of level 3.

The embodiments of the present invention can offer the following effects.

(1) In an overlapping area between a plurality of consecutively input fingerprint images having a given resolution, a high-resolution image having a resolution higher than the given resolution is generated. This enables synthesizing partial images with the high-resolution image to generate a fingerprint image partially or wholly enhanced in resolution.

(2) A fingerprint image partially or wholly enhanced in resolution is used for fingerprint authentication, and is utilized in estimating reproducibility (similarity).

(3) A feature quantity can be extracted from a plurality of partial fingerprint images having a given resolution and is used as a feature quantity that is extractable from only the fingerprint image having a resolution higher than the given resolution.

(4) An overlapping area of a fingerprint image is divided into small areas to determine whether resolution enhancing is possible for each small area. This enables extracting only the area without distortion to generate a high-resolution image even if the fingerprint image is partially distorted.

(5) In such a manner, an overlapping area between a plurality of fingerprint images is determined and a fingerprint image partially or wholly enhanced in resolution is used to improve the precision of fingerprint verification.

While most preferred embodiments of the present invention have been described above, the present invention is not limited by the above description. Various modifications and alterations will apparently be possible to those skilled in the art, based on the substance of the invention described in the appended claims or disclosed in the best modes for carrying out the invention, and such modifications and alterations are obviously fall within the scope of the present invention.

The embodiments discussed herein are related to fingerprint authentication using a fingerprint image, and is useful with such an advantage of facilitating extraction of a feature quantity using a low-resolution fingerprint image to improve the precision of fingerprint authentication.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A fingerprint image acquiring device comprising:
a fingerprint image input unit to which fingerprint images are input consecutively;
an image correlating unit to correlate a plurality of fingerprint images input from the fingerprint image input unit, the image correlating unit matching the input fingerprint images in position;
a resolution enhancing determining unit to determine whether an area making resolution enhancing possible is present by detecting an area overlapping between fingerprint images as a result of image correlating and estimating similarity between the fingerprint images;
an image synthesizing unit to synthesize the fingerprint images based on a result of the position matching by the image correlating unit; and
a resolution enhancing unit to enhance a resolution of the area making resolution enhancing possible in the fingerprint image, wherein
a fingerprint image is generated by partially enhancing the fingerprint image input to the fingerprint image input unit in resolution.

2. The fingerprint image acquiring device of claim 1, wherein
the resolution enhancing determining unit includes:
a feature quantity extracting unit to extract a feature quantity from a fingerprint image; and
a feature quantity comparing unit to compare extracted feature quantities between fingerprint images, and wherein
reproducibility is estimated based on a feature quantity extracted from a fingerprint image to determine whether resolution enhancing is possible.

3. The fingerprint image acquiring device of claim 2, wherein
the feature quantity includes any one of a ridgeline shape (ridgeline pattern) and an end point and a branch point of a ridgeline (feature point).

4. The fingerprint image acquiring device of claim 1, wherein
the resolution enhancing determining unit further includes an area dividing unit to divide an overlapping area into small areas, and wherein
reproducibility between fingerprint images is estimated for each small area to determine whether resolution enhancing is possible, and an area making resolution enhancing possible is enhanced in resolution.

5. The fingerprint image acquiring device of claim 4, wherein
the area dividing unit includes:
a sensor information acquiring unit to acquire sensor information indicative of a fingerprint sensor used as the fingerprint image input unit; and
an area shape selecting unit to receive the sensor information from the sensor information acquiring unit to select an area shape for dividing the fingerprint image in accordance with the sensor information, and wherein
the fingerprint image is divided into area shapes according to the fingerprint sensor.

6. The fingerprint image acquiring device of claim 5, wherein
the overlapping area is divided into block shapes when a sweep fingerprint sensor is used as the fingerprint image input unit.

7. The fingerprint image acquiring device of claim 5, wherein
  division is carried out using a given shape based on a position of a feature point as a reference when a flat fingerprint sensor is used as the fingerprint image input unit.

8. A fingerprint authenticating apparatus comprising:
  a fingerprint image input unit to which fingerprint images are input consecutively;
  an image correlating unit to match a plurality of fingerprint images in position;
  a resolution enhancing determining unit to determine whether an area making resolution enhancing possible is present by detecting an area overlapping between fingerprint images as a result of image correlating and estimating similarity between the fingerprint images;
  an image synthesizing unit to synthesize the fingerprint images based on a result of the position matching by the image correlating unit;
  a resolution enhancing unit to enhance a resolution of the area making resolution enhancing possible in the fingerprint image;
  a feature information generating unit to generate feature information from a fingerprint image enhanced in resolution by the resolution enhancing unit; and
  a fingerprint verification unit to verify acquired feature information with pre-registered feature information.

9. A fingerprint authenticating apparatus having the fingerprint image acquiring device of claim 2, comprising:
  a feature information generating unit to generate feature information from a fingerprint image generated by the image synthesizing unit; and
  a fingerprint verification unit to verify acquired feature information with pre-registered feature information.

10. The fingerprint authenticating apparatus of claim 8, wherein
  the feature information generating unit includes:
    a feature quantity extracting unit to extract a plurality of types of feature quantities;
    an image area acquiring unit to acquire an area of a high-resolution image from the fingerprint image enhanced in resolution by the resolution enhancing unit; and
    a feature quantity extraction selecting unit to select a feature quantity based on the area that is acquired.

11. The fingerprint authenticating apparatus of claim 8, wherein
  information of an outline of a ridgeline is extracted as a feature quantity.

12. The fingerprint authenticating apparatus of claim 8, wherein
  a position of a sweat gland pore on a ridgeline is extracted as a feature quantity.

13. The fingerprint authenticating apparatus of claim 8, wherein
  the fingerprint verification unit includes:
    a plurality of feature quantity comparing units to compare a plurality of types of feature quantities extracted from the fingerprint image;
    a comparison selecting unit to select one of the feature quantity comparing units in accordance with a type of the feature quantity; and
    a verification determining unit to verify the feature information with each other based on a comparison result given by the feature quantity comparing unit selected by the comparison selecting unit.

14. The fingerprint authenticating apparatus of claim 13, comprising:
  a resolution enhancing unit to generate a high-resolution image in an area of a given shape based on a feature point as a reference;
  an image synthesizing unit to update information of a position of a feature point to information of the position of the feature point in a synthesized image every time partial images are synthesized, the image synthesizing unit correlating the feature point with a high-resolution image to store the correlated feature point and high-resolution image;
  a feature information generating unit to extract either or both of information of an outline of a ridgeline and a position of a sweat gland pore from a high-resolution image, the feature information generating unit correlating the extracted information or position with a feature point to generate feature information; and
  a fingerprint verification unit to verify feature points included in each piece of feature information with each other, the fingerprint verification unit further verifying feature points determined to be matching with each other in terms of either or both of information of an outline of a ridgeline and a position of a sweat gland pore and determining whether the feature points are matching to output a determination result corresponding to the number of matching feature points.

15. A fingerprint image acquiring method comprising:
  consecutively taking in fingerprint images;
  matching a plurality of fingerprint images in position;
  determining whether an area making resolution enhancing possible is present by detecting an area overlapping between fingerprint images as a result of image correlating and estimating similarity between the fingerprint images;
  synthesizing the fingerprint images based on a result of the position matching; and
  enhancing a resolution of the area making resolution enhancing possible in the fingerprint image, wherein
  a fingerprint image is generated by partially enhancing the consecutively input fingerprint images in resolution.

16. A fingerprint authenticating method comprising:
  consecutively taking in fingerprint images;
  matching a plurality of fingerprint images in position;
  determining whether an area making resolution enhancing possible is present by detecting an area overlapping between fingerprint images as a result of image correlating and estimating similarity between the fingerprint images;
  synthesizing the fingerprint images based on a result of the position matching;
  enhancing a resolution of the area making resolution enhancing possible in the fingerprint image;
  generating feature information from a synthesized image enhanced in resolution; and
  verifying acquired feature information with pre-registered feature information.

17. A non-transitory computer-readable recording medium having recorded thereon a fingerprint image acquiring program to be executed by a computer, the program comprising:
  consecutively taking in fingerprint images;
  matching a plurality of fingerprint images in position;
  determining whether an area making resolution enhancing possible is present by detecting an area overlapping between fingerprint images as a result of image correlating and estimating similarity between the fingerprint images;

synthesizing the fingerprint images matched in position based on a result of the position matching; and enhancing a resolution of the area making resolution enhancing possible in the fingerprint image, wherein a fingerprint image is generated by partially enhancing the fingerprint images consecutively input by the computer in resolution.

18. A non-transitory computer-readable recording medium having recorded thereon a fingerprint authenticating program to be executed by a computer, the program comprising:

consecutively taking in fingerprint images;

matching a plurality of fingerprint images in position;

determining whether an area making resolution enhancing possible is present by detecting an area overlapping between fingerprint images as a result of image correlating and estimating similarity between the fingerprint images;

synthesizing the fingerprint images matched in position based on a result of the position matching;

enhancing a resolution of the area making resolution enhancing possible in the fingerprint image;

generating feature information from a synthesized image enhanced in resolution; and verifying acquired feature information with pre-registered feature information.

19. A fingerprint image acquiring device comprising:

a fingerprint image input unit to which fingerprint images are input consecutively; and a processor, wherein the processor executes a process including:

correlating a plurality of fingerprint images input from the fingerprint image input unit;

matching the input fingerprint images in position;

determining whether an area making resolution enhancing possible is present by detecting an area overlapping between fingerprint images as a result of image correlating and estimating similarity between the fingerprint images;

synthesizing the fingerprint images based on a result of the position matching; and enhancing a resolution of the area making resolution enhancing possible in the fingerprint image, wherein a fingerprint image is generated by partially enhancing the consecutively input fingerprint images in resolution.

20. A fingerprint authenticating apparatus comprising:

a fingerprint image input unit to which fingerprint images are input consecutively; and a processor, wherein the processor executes a process including:

matching the input fingerprint images in position;

determining whether an area making resolution enhancing possible is present by detecting an area overlapping between fingerprint images as a result of image correlating and estimating similarity between the fingerprint images;

synthesizing the fingerprint images based on a result of the position matching;

enhancing a resolution of the area making resolution enhancing possible in the fingerprint image;

generating feature information from a synthesized image enhanced in resolution; and verifying acquired feature information with pre-registered feature information.

* * * * *